(12) United States Patent
Sato et al.

(10) Patent No.: US 11,509,829 B2
(45) Date of Patent: Nov. 22, 2022

(54) ELECTRONIC APPARATUS AND METHOD FOR CONTROLLING THE SAME AND STORAGE MEDIUM

(71) Applicant: CANON KABUSHIKI KAISHA, Tokyo (JP)

(72) Inventors: Ayumi Sato, Kawasaki (JP); Toshimichi Ise, Yokohama (JP); Akio Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/563,441

(22) Filed: Sep. 6, 2019

(65) Prior Publication Data

US 2020/0084390 A1    Mar. 12, 2020

(30) Foreign Application Priority Data

Sep. 11, 2018 (JP) .............................. JP2018-170082
Sep. 11, 2018 (JP) .............................. JP2018-170083
Sep. 11, 2018 (JP) .............................. JP2018-170084

(51) Int. Cl.
*H04N 5/232* (2006.01)

(52) U.S. Cl.
CPC ... *H04N 5/232933* (2018.08); *H04N 5/23296* (2013.01)

(58) Field of Classification Search
CPC ......... H04N 5/232933; H04N 5/23296; H04N 5/23245; H04N 5/23216; H04N 5/23212; H04N 5/225; H04N 5/23293; H04N 5/232122; H04N 5/232123; H04N 2101/00

USPC .................................................... 348/240.99
See application file for complete search history.

(56) References Cited

U.S. PATENT DOCUMENTS

| 5,774,187 A * | 6/1998 | Tsunoda ................. H04N 21/47 348/E9.04 |
| 6,633,729 B1 | 10/2003 | Yoshikawa |
| 6,937,284 B1 * | 8/2005 | Singh ................. H04N 5/23206 348/346 |
| 7,324,151 B2 * | 1/2008 | Onozawa ......... H04N 5/232123 348/346 |

(Continued)

FOREIGN PATENT DOCUMENTS

| CN | 1780366 A | 5/2006 |
| CN | 101802705 A | 8/2010 |

(Continued)

*Primary Examiner* — Pritham D Prabhakher
(74) *Attorney, Agent, or Firm* — Canon U.S.A., Inc. IP Division

(57) ABSTRACT

There is provided with an electronic apparatus including an acquisition unit configured to acquire a first number of values related to a specific function, the first number of values each being able to take one of N values, and a display control unit configured to perform control to display a first number of display items, each display item corresponding to a respective one of the first number of values acquired by the acquisition unit, each of the first number of display items being able to represent one of n values, where n is smaller than N. A value represented by each display item is determined according to a plurality of values other than the value corresponding to the display item out of the first number of values acquired by the acquisition unit.

9 Claims, 20 Drawing Sheets

(56) References Cited

U.S. PATENT DOCUMENTS

| | | | | |
|---|---|---|---|---|
| 7,864,240 B2* | 1/2011 | Ide | | H04N 5/232933 |
| | | | | 348/347 |
| 8,350,945 B2* | 1/2013 | Yumiki | | G03B 17/14 |
| | | | | 348/346 |
| 8,525,923 B2* | 9/2013 | Hamada | | G02B 7/36 |
| | | | | 348/346 |
| 8,970,730 B2* | 3/2015 | Ebina | | H04N 5/243 |
| | | | | 348/226.1 |
| 9,516,216 B2* | 12/2016 | Onsen | | H04N 5/232939 |
| 9,602,732 B2* | 3/2017 | Mäkinen | | H04R 3/005 |
| 9,690,168 B2* | 6/2017 | Jannard | | G03B 13/18 |
| 10,075,638 B2* | 9/2018 | Sudo | | H04N 5/23296 |
| 10,404,921 B2* | 9/2019 | Makinen | | H04N 5/247 |
| 10,778,900 B2* | 9/2020 | Kelly | | G06K 9/00315 |
| 2003/0174233 A1* | 9/2003 | Onozawa | | H04N 5/232945 |
| | | | | 348/E5.045 |
| 2007/0241911 A1* | 10/2007 | Swan | | G08B 21/0476 |
| | | | | 348/E7.087 |
| 2007/0286596 A1* | 12/2007 | Lonn | | H04N 1/0049 |
| | | | | 715/810 |
| 2008/0025712 A1* | 1/2008 | Furuya | | G03B 17/18 |
| | | | | 396/88 |
| 2008/0074531 A1* | 3/2008 | Ide | | H04N 5/232945 |
| | | | | 348/346 |
| 2010/0119220 A1 | 5/2010 | Lin | | |
| 2010/0208122 A1* | 8/2010 | Yumiki | | H04N 5/232123 |
| | | | | 348/E5.022 |
| 2012/0033095 A1 | 2/2012 | Naka | | |
| 2012/0050604 A1* | 3/2012 | Hamada | | H04N 5/23209 |
| | | | | 348/E5.045 |
| 2012/0051731 A1* | 3/2012 | Hamada | | G03B 17/14 |
| | | | | 396/125 |
| 2012/0057062 A1* | 3/2012 | Hamada | | G02B 7/102 |
| | | | | 348/E5.045 |
| 2013/0342726 A1* | 12/2013 | Ebina | | H04N 5/23245 |
| | | | | 348/226.1 |
| 2014/0210601 A1* | 7/2014 | Sato | | G06F 3/041 |
| | | | | 340/407.2 |
| 2014/0368719 A1 | 12/2014 | Kaneko | | |
| 2015/0296131 A1* | 10/2015 | Onsen | | H04N 5/23216 |
| | | | | 348/207.11 |
| 2015/0326793 A1* | 11/2015 | Mäkinen | | H04N 5/2628 |
| | | | | 348/240.99 |
| 2015/0350525 A1* | 12/2015 | Sudo | | H04N 5/232933 |
| | | | | 348/240.2 |
| 2017/0010788 A1* | 1/2017 | Srinivasaraghavan | | |
| | | | | H04N 21/4828 |
| 2017/0150062 A1* | 5/2017 | Makinen | | G06F 3/03548 |
| 2017/0295299 A1* | 10/2017 | Ise | | H04N 1/6027 |
| 2018/0069983 A1* | 3/2018 | Cho | | G06F 3/0481 |
| 2018/0150062 A1* | 5/2018 | Shapiro | | G05B 19/409 |
| 2018/0198982 A1* | 7/2018 | Lee | | H04N 5/23258 |
| 2018/0284979 A1* | 10/2018 | Choi | | H04N 5/23293 |
| 2019/0068893 A1* | 2/2019 | Kim | | G06F 3/00 |
| 2019/0281223 A1* | 9/2019 | Kelly | | G06F 1/1684 |

FOREIGN PATENT DOCUMENTS

| | | |
|---|---|---|
| CN | 102055907 A | 5/2011 |
| CN | 102929573 A | 2/2013 |
| CN | 102981697 A | 3/2013 |
| CN | 105323470 A | 2/2016 |
| CN | 107018319 A | 8/2017 |
| CN | 107948509 A | 4/2018 |
| JP | 2004-297279 A | 10/2004 |
| JP | 2007-221721 A | 8/2007 |
| JP | 2008-193784 A | 8/2008 |
| JP | 2010-056972 A | 3/2010 |
| JP | 2011-159180 A | 8/2011 |
| JP | 2015-118504 A | 6/2015 |
| JP | 2017-072944 A | 4/2017 |
| KR | 2013-0035785 A | 4/2013 |
| WO | 2007063613 A1 | 6/2007 |
| WO | 2017/214086 A1 | 12/2017 |

* cited by examiner

FIG.11

UNIT: STEP (= K)

| | | \multicolumn{17}{c|}{V(i) - V(i - 1)} |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 |
| b | 0 | 0 | | | | | | | | | | | | | | | | |
| | 1 | 0 | \multicolumn{4}{c|}{1} | \multicolumn{4}{c|}{2} | \multicolumn{4}{c|}{3} | \multicolumn{4}{c|}{4} |
| | 2 | 0 | \multicolumn{5}{c|}{1} | \multicolumn{5}{c|}{2} | \multicolumn{5}{c|}{3} | |
| | 3 | 0 | \multicolumn{7}{c|}{1} | \multicolumn{7}{c|}{2} | | |
| | 4 | | \multicolumn{15}{c|}{1} | | b: NUMBER OF SETTING VALUES HAVING DIFFERENCE FROM SETTING VALUE OF ONE-SIDE ADJACENT SETTING VALUE

ELECTRONIC APPARATUS AND METHOD FOR CONTROLLING THE SAME AND STORAGE MEDIUM

BACKGROUND OF THE INVENTION

Field of the Invention

The present invention relates to an electronic apparatus and a method for controlling the same.

Description of the Related Art

As a method of information display of setting values and operation statuses of a specific function in an electronic apparatus, a certain method is known to switch between a detailed display method and a simplified display method for the same information depending on the status and display location. Japanese Patent Application Laid-Open No. 2008-193784 discusses a technique of a simplified remaining battery level display (simplified display) for displaying the remaining battery level of a power source apparatus in a plurality of steps with a coarse granularity, for example, in four steps or around, by using a battery mark. Japanese Patent Application Laid-Open No. 2008-193784 also discusses a technique of a detailed remaining battery level display for displaying the remaining battery level with a finer granularity than a battery mark, such as a percentage or voltage. Japanese Patent Application Laid-Open No. 2004-297279 discusses a technique of a simplified remaining battery level display for displaying black marked portions in a remaining battery level icon. When the remaining battery level is 100 to 67% (sufficient or high level), three black marked portions are displayed. When the remaining battery level is 66 to 34% (medium level), two black marked portions are displayed. When the remaining battery level is 33% or less (low level), one black marked portion is displayed. When the remaining battery level is 0 (empty), no black marked portion is displayed. More specifically, Japanese Patent Application Laid-Open No. 2004-297279 discusses a technique for displaying the remaining battery level in a rounded way by uniquely associating the remaining battery level acquirable in percentage (a large number of steps) with four steps (a small number of steps).

In a technique for displaying the remaining battery level by uniquely associating values in a large number of steps with values in a small number of steps, like the simplified remaining battery level display discussed in Japanese Patent Application Laid-Open No. 2008-193784 and Japanese Patent Application Laid-Open No. 2004-297279, when a plurality of values is displayed side by side, the difference between values may not be grasped depending on the combination of values even if the actual values are different. For example, when the remaining battery levels of a plurality of batteries are displayed side by side (for example, a battery A has a remaining battery level of 65% and a battery B has a remaining battery level of 35%) by using the simplified display discussed in Japanese Patent Application Laid-Open No. 2004-297279, it seems that both batteries have the same remaining battery level although the battery A has a larger remaining battery level than the battery B.

A certain electronic apparatus is known to display what operation is currently being performed on an operation member as supplementary information for a user. Japanese Patent Application Laid-Open No. 2015-118504 discusses a technique for displaying the pressing force of a user applied to a touch panel and a message (such as "press more strongly") for prompting the user to press the touch panel with a depression pressure within a tolerance range. This technique is described to enable the user to recognize whether the depression pressure during the user's own input operation is stronger or weaker than an appropriate value or within or out of the tolerance range, and to adjust the depression pressure for the next operation.

Japanese Patent Application Laid-Open No. 2007-221721 discusses a technique for displaying a function currently being assigned to each push-down position for a touch wheel button of which one of a plurality of push-down positions can be depressed, and displaying a position on the touch wheel button currently being touched by the user.

Conventional techniques discussed in Japanese Patent Application Laid-Open No. 2015-118504 and Japanese Patent Application Laid-Open No. 2007-221721 make it possible to display what operation is currently being performed on an operation member and what function is assigned to the operation currently being performed. However, when processing implementable in response to the current operation can be implemented with another operation, the user has not been able to recognize the fact.

A certain electronic apparatus is known to enable a user to change and register a function performed in response to an operation on an operation member to achieve a preferable operation feeling that meets the purpose and preference of each user operating the operation member.

Japanese Patent Application Laid-Open No. 2010-056972 discusses an electronic apparatus which enables a user to register a function to be executed for each predetermined rotational angle (degree of rotation as an operation amount) with respect to the initial position, through an operation on a rotatable rotary member. Japanese Patent Application Laid-Open No. 2011-159180 discusses a technique for enabling a user to customize and register touch buttons to be arranged at a plurality of displayable positions of touch buttons on a touch panel. Japanese Patent Application Laid-Open No. 2011-159180 also discusses a technique for setting an arrangement pattern of touch buttons for a plurality of displayable positions based on a preset pattern.

If the user can assign and register a plurality of different setting values to a specific function for each operation amount on an operation member, the user can perform a setting operation according to the user's preference for the specific function. However, performing an operation for assigning a setting value to each of a plurality of operation amounts increases the number of operation steps, making the operation complicated. In addition, it is not easy for the user to find out easy-to-use pattern of setting value assignment to a plurality of operation amounts. For this issue, neither the technique discussed in Japanese Patent Application Laid-Open No. 2010-056972 nor the technique discussed in Japanese Patent Application Laid-Open No. 2011-159180 takes into consideration a method for enabling a user to assign and register a plurality of different setting values for a specific function item for each operation amount on an operation member.

SUMMARY OF THE INVENTION

According to a first aspect of the present invention, when a plurality of values in a large number of steps is displayed as the plurality of values in a small number of steps in a simplified way, the plurality of values is displayed in such a way that differences between values can be recognized.

According to a second aspect of the present invention, when certain processing implementable in response to a current operation can be implemented through another operation, a user is notified of the operation.

According to a third aspect of the present invention, when the user can assign a plurality of different values for a specific function to a plurality of steps of an operation amount on an operation member, the user is enabled to easily perform an assignment operation.

An electronic apparatus includes a memory and at least one processor which function as: an acquisition unit configured to acquire a first number of values related to a specific function, the first number of values each being able to take one of N values, and a display control unit configured to perform control to display a first number of display items, each display item corresponding to a respective one of the first number of values acquired by the acquisition unit, each of the first number of display items being able to represent one of n values, where n is smaller than N. A value represented by each display item is determined according to a plurality of values other than the value corresponding to the display item out of the first number of values acquired by the acquisition unit.

An electronic apparatus includes a memory and at least one processor which function as: a setting unit configured to divide an operation amount on a specific operation member into M steps, and assign and set a processing content to each step of the operation amount, and a control unit configured to perform control to, when the specific operation member is operated, perform an identification display of an N-th step corresponding to the operated operation amount so as to be identifiable from steps assigned other processing contents, and, when an i-th step different from the N-th step is assigned the same processing content as the N-th step, also perform the identification display of the i-th step.

An electronic apparatus includes a memory and at least one processor which function as: a setting unit configured to assign and set a processing content to each of a plurality of operation methods, and a control unit configured to perform control to, when a first operation method is performed, perform an identification display of the first operation method or a processing content assigned to the first operation method so as to be identifiable from operation methods assigned other processing contents, and, when a second operation method different from the first operation method is assigned the same processing content as the first operation method, also perform the identification display of the second operation method or a processing content assigned to the second operation method.

An electronic apparatus includes a detector configured to detect at least an operation amount in a first direction on an operation member, and a memory and at least one processor which function as: an assignment unit configured to, based on a user operation, respectively assign different values of a specific function to a plurality of steps of the operation amount in the first direction. The assignment unit is also capable of respectively assigning values based on at least one prestored preset pattern to the plurality of steps. The at least one preset pattern includes a preset pattern for assigning a first value of the specific function to a maximum step including a maximum operation amount in the first direction detectable by the detector, and respectively assigning the same values smaller than the first value to the plurality of steps in the first direction detectable by the detector, except for the maximum step and one in an inoperative state.

Further features of the present invention will become apparent from the following description of exemplary embodiments with reference to the attached drawings.

BRIEF DESCRIPTION OF THE DRAWINGS

FIGS. 4C-1, 4C-2, 4D-1, 4D-2, 4E-1, and 4E-2 illustrate display examples of a user setting confirmation screen and a user setting editing screen on the display unit.

FIGS. 10A-1 to 10A-3 illustrate display examples of speed bars by the zooming speed setting detailed display processing.

FIGS. 10B-1 to 10B-3 illustrate display examples of speed bars by the zooming speed setting simplified display processing.

FIG. 11 illustrates a correspondence between a variable b and the number of steps determined by {V(i)–V(i–1)}.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Exemplary embodiments according to the present invention will be described below with reference to the accompanying drawings.

Figure 1A:
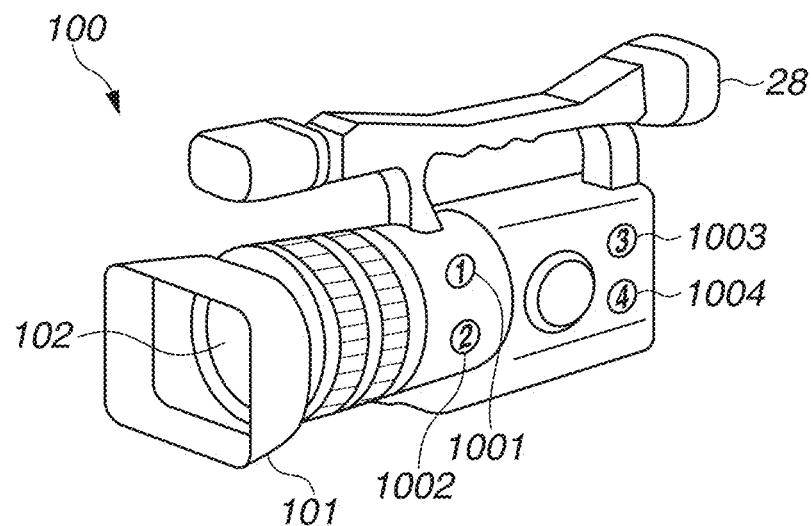
FIGS. 1A to 1C are external views illustrating a digital camera.
Figure 1B:
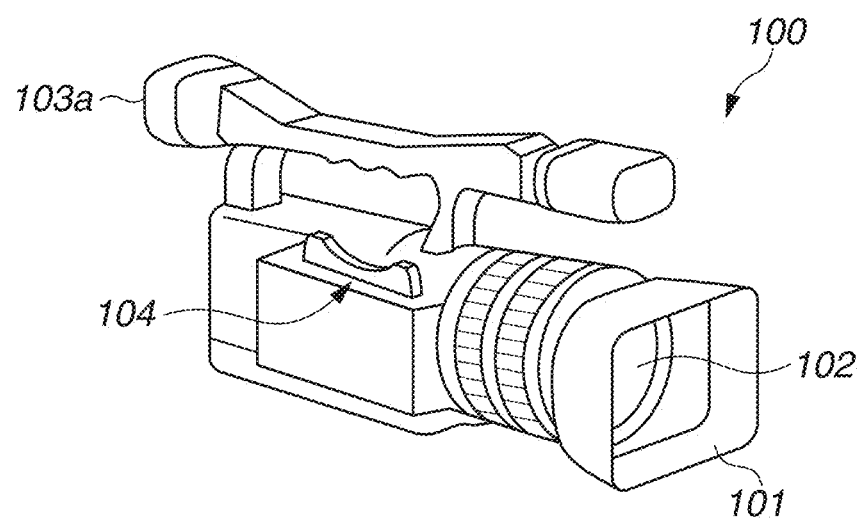
Figure 1C:
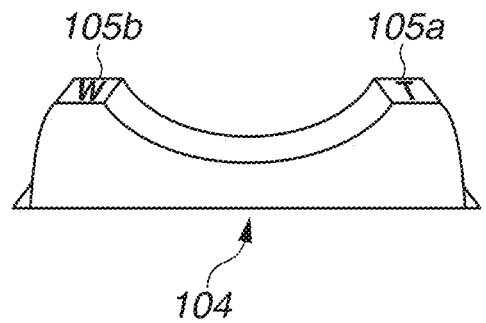

FIGS. 1A to 1C are external views illustrating a digital camera 100 (digital camcorder) as an example of an electronic apparatus (display control apparatus) according to the present invention. FIG. 1A illustrates the digital camera 100 when viewed from one side face, and FIG. 1B illustrates the digital camera 100 when viewed from the other side face. The digital camera 100 is provided with a barrier 101 and an imaging lens 102 on the front face. The digital camera 100 is provided with a view finder as a display unit 28 on the rear face. The digital camera 100 is provided with a seesaw-shaped zoom key (grip zoom key) 104 as an operation device on a side face of the main body. Assignment buttons 1 (1001), 2 (1002), 3 (1003), and 4 (1004) are customizing keys each of which can be assigned one of a plurality of functions by a user.

FIG. 1C is an enlarged view illustrating the zoom key 104. The user operates the zoom key 104 through push-down operations. The digital camera 100 is assigned a zooming speed (function) according to the push-down amount (operation amount, depression amount) when the zoom key 104 is pressed from a reference position. The zoom key 104 has a first operation portion 105a and a second operation portion 105b. The first operation portion 105a is a portion operated to issue an instruction for zooming in the telephoto direction (telephoto side). The second operation portion 105b is a portion operated to issue an instruction for zooming in the wide-angle direction (wide-angle side). When the user presses the first operation portion 105a, the digital camera 100 zooms in at a zooming speed assigned to the depression amount. On the other hand, when the user presses the second operation portion 105b, the digital camera 100 zooms out at a zooming speed assigned to the depression amount. The zoom key 104 is configured to return to the reference position (initial position) when the user cancels the depression of the first operation portion 105a or the second operation portion 105b.

Figure 2:
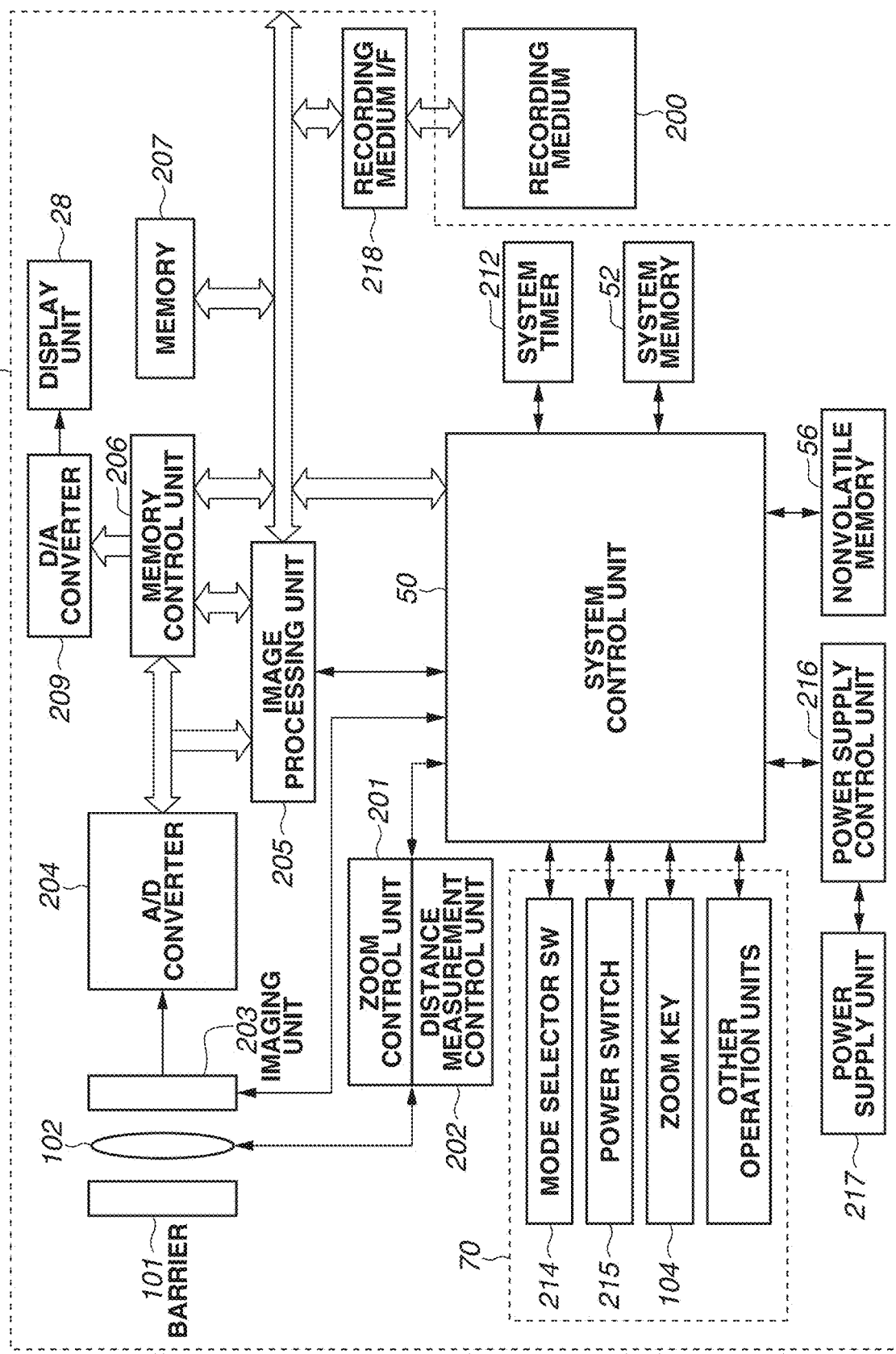
FIG. 2 is a block diagram illustrating a configuration of the digital camera.

FIG. 2 is a block diagram illustrating an example of a configuration of the digital camera 100.

The imaging lens 102 is a lens group including a zoom lens and a focus lens. The zoom lens changes the zooming magnification by changing the focal length and is controlled by a zoom control unit 201. The focus lens performs focusing and is controlled by a distance measurement control unit 202.

An imaging unit 203 is an image sensor composed of a charge coupled device (CCD) or complementary metal oxide semiconductor (CMOS) sensor for converting an optical image into an electric signal. An analog-to-digital (A/D) converter 204 converts an analog signal output from the imaging unit 203 into a digital signal. The barrier 101 covers the imaging system of the digital camera 100 including the imaging lens 102 to prevent the imaging system from being soiled or damaged.

An image processing unit 205 performs predetermined pixel interpolation, resizing processing such as reduction, and color conversion processing on image data from the A/D converter 204 or image data from a memory control unit 206. The image processing unit 205 performs predetermined calculation processing on captured image data. Then, based on an obtained calculation result, a system control unit 50 performs exposure control and distance measurement control. This enables performing automatic focus (AF) processing, automatic exposure (AE) processing, and electronic flash preliminary emission (EF) processing based on the through-the-lens (TTL) method. The image processing unit 205 also performs predetermined calculation processing on captured image data and, based on an obtained calculation result, performs TTL-based automatic white balance (AWB) processing.

Image data from the A/D converter 204 is directly stored in a memory 207 via the image processing unit 205 and the memory control unit 206 or via the memory control unit 206. The memory 207 stores image data obtained by the imaging unit 203 and converted into digital data by the A/D converter 204 and image data to be displayed on the display unit 28. The memory 207 has a sufficient storage capacity for storing a predetermined number of still images, and moving images and sound for a predetermined time period. The memory 207 also serves as an image display memory (video memory) used when displaying on the display unit 28 image data and on screen display (OSD) data read from a recording medium 200.

A digital-to-analog (D/A) converter 209 converts image display data stored in the memory 207 into an analog signal and supplies the analog signal to the display unit 28. Therefore, the image display data stored in the memory 207 is displayed by the display unit 28 via the D/A converter 209. The display unit 28 displays an image based on the analog signal from the D/A converter 209, on a display such as a liquid crystal display (LCD). The digital signal generated through A/D conversion by the A/D converter 204 and stored in the memory 207 is then converted into an analog signal by the D/A converter 209. Successively transmitting images to the display unit 28 to display images thereon enables the display unit 28 to function as an electronic view finder for displaying a live view. Although the display unit 28 according to the present exemplary embodiment is a liquid crystal display, the display unit 28 may be a display of another type, such as an organic electroluminescence (EL) display. Although the display unit 28 according to the present exemplary embodiment is an electronic view finder, the display unit 28 may be a small (for example, 3.5-inch) liquid crystal display monitor, or an external output, such as a high-definition multimedia interface (HDMI, registered trademark), or a Serial Digital Interface (SDI). Further, the display unit 28 may be provided with a plurality of display output systems described above.

A nonvolatile memory 56 is an electrically erasable recordable recording medium such as an electrically erasable programmable read only memory (EEPROM). The nonvolatile memory 56 stores constants and programs for operations of the system control unit 50. Programs stored in the nonvolatile memory 56 refer to programs for executing various flowcharts (described below) according to the present exemplary embodiment.

The system control unit 50 is at least one processor and/or at least one circuit for controlling the entire digital camera 100. When the system control unit 50 executes the programs stored in the nonvolatile memory 56, each piece of processing according to the present exemplary embodiment (described below) is implemented. The system control unit 50 also controls the memory 207, the D/A converter 209, and the display unit 28 to perform display control.

A system memory 52 is, for example, a random access memory (RAM). The system memory 52 stores constants and variables for operations of the system control unit 50 and programs read from the nonvolatile memory 56. A system timer 212 is a time measurement unit for measuring time used for various control and time of a built-in clock.

An operation unit 70 is an operation unit for inputting various operation instructions to the system control unit 50. The operation unit 70 includes a menu button, a cancel button, a cross key (up, down, right, and left keys), a SET button, and an automatic focus/manual focus (AF/MF) selection button. The operation unit 70 also includes assignment buttons 1 (1001), 2 (1002), 3 (1003), and 4 (1004) which can be assigned functions through menu setting. For example, when the menu button is pressed, a menu screen in which various settings can be made is displayed on the display unit 28. The user can intuitively make various settings by using the menu screen displayed on the display unit 28, the cross key, and the SET button.

A mode selector switch 214 selects any one of the movie recording mode, playback mode, and other operation modes of the system control unit 50.

A power switch 215 is a push button for turning power ON and OFF.

A zoom key 104, a seesaw-shaped operation member, included in the operation unit 70 is operated by being pressed. The system control unit 50 detects the push-down amount of the first operation portion 105a or the second operation portion 105b of the zoom key 104 and controls the zoom control unit 201 to change the position of the imaging lens 102 to achieve the zooming speed assigned to the push-down amount. According to the present exemplary embodiment, the larger push-down amount of the zoom key 104 produces a larger voltage variation. Therefore, the system control unit 50 detects the push-down amount by detecting the voltage output by the zoom key 104.

A power source control unit 216 includes a battery detection circuit, a direct-current to direct-current (DC-DC) converter, and a switch circuit for selecting a block to be supplied with power. The power source control unit 216 detects the presence or absence of a battery, the battery type, and the remaining battery capacity. The power source control unit 216 also controls the DC-DC converter based on the detection result and an instruction of the system control unit 50 to supply required voltages to the recording medium 200 and other components for required time periods.

A power source unit 217 includes a primary battery (such as an alkaline battery or lithium battery), a secondary battery (such as a NiCd battery, NiMH battery, or Li battery), and an alternating current (AC) adaptor. A recording medium interface (I/F) 218 is an interface to the recording medium 200 such as a memory card or hard disk. The recording medium 200 for recording captured images includes a semiconductor memory such as a memory card and magnetic disk.

The zooming speed is an important factor as a visual expression technique for moving images. For example, zooming in at a high zooming speed makes it possible to quickly enlarge a far subject and make a movie viewer feel speediness but gives an impression of a restless rough camera work. Even when a subject (such as an actor) who is only speaking with few motions is being captured, zooming in at a low zooming speed makes it possible to reduce the possibility of giving the viewer a tedious impression and make the viewer further focus on the subject at the center of the zoom-in image. In this case, however, a far subject cannot be enlarged to a sufficient size within a short time. In a certain zooming operation, zooming at a constant zooming speed may be demanded. In another zooming operation, it may be demanded to initially perform slow zooming and subsequently perform fast zooming. In this way, a preferable zooming speed depends on the situation of zooming and the intention of an image maker. Therefore, it is demanded to selectively use the zooming speed according to a photographer's intention with sufficient operability.

The digital camera 100 according to the present exemplary embodiment makes it possible to selectively use various zooming speeds with sufficient operability in zooming operations performed by operating the zoom key 104. In the digital camera 100, any one of at least fixed-speed zoom, variable-speed zoom, and user-setting zoom can be selected and set as a zooming type in response to an operation on the zoom key 104. Each zooming type will be described in detail below. At least three different preset patterns of the zooming speeds for the respective depression levels of the zoom key 104 can be used. In addition, based on a preset pattern, the user can change the zooming speeds for the respective depression levels for customization and register the customized pattern to use them. More specifically, in a state where a preset pattern is assigned, the user can adjust the zooming speed assigned to each of the plurality of depression levels through a user operation. The present exemplary embodiment will be described below centering on zoom control in response to an operation on the zoom key 104.

According to the present exemplary embodiment, the system control unit 50 converts the voltage detected when the zoom key 104 is pressed and acquires a numerical value from −127 to +127 indicating the depression amount (push-down amount). When the zoom key 104 is not pressed, the system control unit 50 acquires the numerical value 0. When the first operation portion 105a is pressed (when pressed in the clockwise direction around the fulcrum of the zoom key 104), the system control unit 50 acquires a numerical value from 1 to 127 indicating that a zooming operation is being performed toward the telephoto side. When the second operation portion 105b is pressed (when pressed in the counterclockwise direction around the fulcrum of the zoom key 104), the system control unit 50 acquires a numerical value −1 to −127 indicating that a zooming operation is being performed toward the wide-angle side (minimum-object-distance side). In either operation, the larger absolute value indicates that the first or second operation portion is pressed more strongly (pushed down more deeply), and the positive/negative sign of the numerical value indicates the zooming direction. In the digital camera 100, the numerical values from 1 to 127 and from −1 to −127 are divided (classified) into five different levels which are assigned zooming speeds for management. More specifically, the zooming speeds are managed by being assigned to five different levels of the operation amount. Although the present exemplary embodiment will be described below centering on an example where the operation amount is divided into five steps, the operation amount may be divided into two or more levels or three or more levels. In the five-step operation amount according to the present exemplary embodiment, the system control unit 50 performs control in the following way. When the system control unit 50 acquires a numerical value from 1 to 25, the system control unit 50 sets the numerical value to the depression level 1 toward the telephoto side and performs a zooming operation toward the telephoto side at the zooming speed corresponding to the depression level 1. When the system control unit 50 acquires a numerical value from 26 to 50, the system control unit 50 sets the numerical value to the depression level 2 toward the telephoto side and performs a zooming operation toward the telephoto side at the zooming speed corresponding to the depression level 2. Likewise, the system control unit 50 sets a range from 51 to 75, a range from 76 to 100, and a range from 101 to 127 to the depression levels 3, 4, and 5, respectively. More specifically, the depression levels 1 to 4 have a numerical value range of 25, and the depression level 5 (highest depression level) has a numerical value range of 27. Increasing the depression force in the depression levels 1 to 4 causes a shift to an upper depression level, but the depression force larger than the depression force in the depression level 5 cannot be applied. More specifically, except for the depression level 5, increasing the depression amount by 25 causes a shift to an upper depression level in a proportional way. When the system control unit 50 acquires a numerical value from −25 to −1, the system control unit 50 sets the numerical value to the depression level 1 (or depression level −1) toward the wide-angle side and performs a zooming operation toward the wide-angle side at the zooming speed corresponding to the depression level 1. When the system control unit 50 acquires a numerical value from −50 to −26, the system control unit 50 sets the numerical value to the depression level 2 (or depression level −2) toward the wide-angle side and performs a zooming operation toward the wide-angle side at the zooming speed corresponding to the depression level 2. Although, in the present exemplary embodiment, the depression levels with the same absolute value (for example, the depression levels 1 and −1) correspond to zooming speeds with the same absolute value on both the telephoto side and the wide-angle side, the depression levels may be assigned zooming speeds with different absolute values. Voltages, numerical values, and correspondence with depression levels are prestored in the nonvolatile memory 56 in an associated way. Correspondences between these values can be customized by the user. The relation between the depression amount and the 5-step depression level on one side is not limited to the above-described numerical value range. The numerical value range may be equal for all steps or weighted for each step. The numerical value range is weighted for each step, for example, in a case where the numerical value ranges corresponding to the depression levels 1 and 5 are made wider than the range corresponding to other depression levels. Providing such numerical value ranges makes it easier to use the lowest depression level (minimum zooming speed) and the highest depression level (maximum zooming speed). Although, in the above-described example, the depression level is divided into five steps on one side, the present invention is not limited thereto. The depression level may be divided into the larger or smaller number of steps.

In the digital camera 100 according to the present exemplary embodiment, one of 17 steps (steps 0 to 16) of the zooming speed (control value and setting value of the zoom function) is assigned to each of the above-described depression levels of the zoom key 104. Each depression level may be assigned other than 17 steps of zooming speed, and further may be assigned other than numerical values, such as expressions "slow", "normal", and "fast". For example, when the depression level 1 is assigned the zooming speed 3, in a state where the user is pushing down the zoom key 104 at the depression level 1 (corresponding to the depression amount from 1 to 25), zooming is performed toward the telephoto side at the zooming speed 3 if the zoom position has not reached the telephoto end.

In the digital camera 100 according to the present exemplary embodiment, all of zooming speeds can be set to one of the high, medium, and low speeds in addition to the user setting (user customization) zooming speed (described below). More specifically, the zooming speeds "0 to 16" set to each depression level are changed according to the high, medium, and low settings.

Figure 3A:
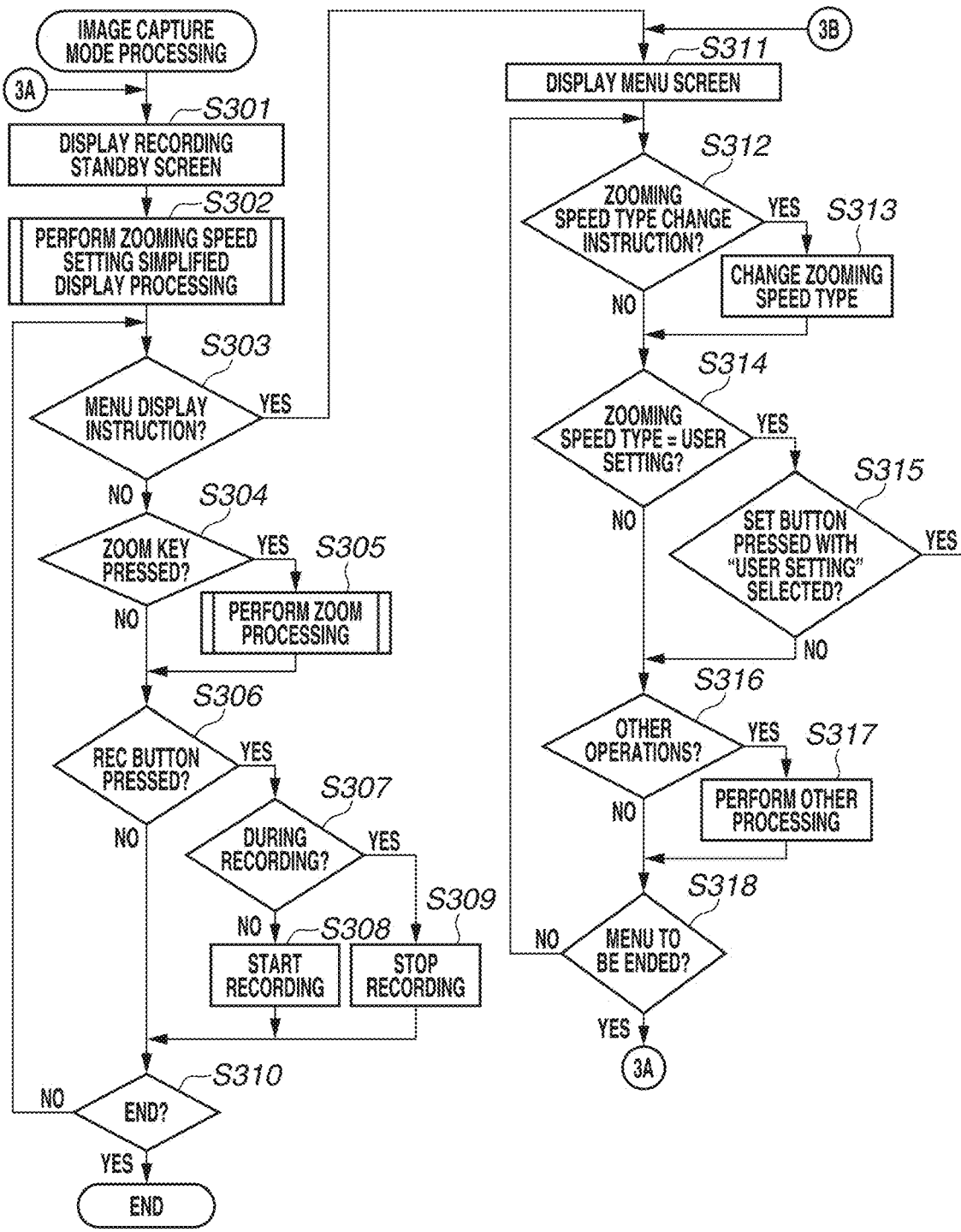
FIGS. 3A and 3B are a flowchart illustrating image capture mode processing.
Figure 3B:
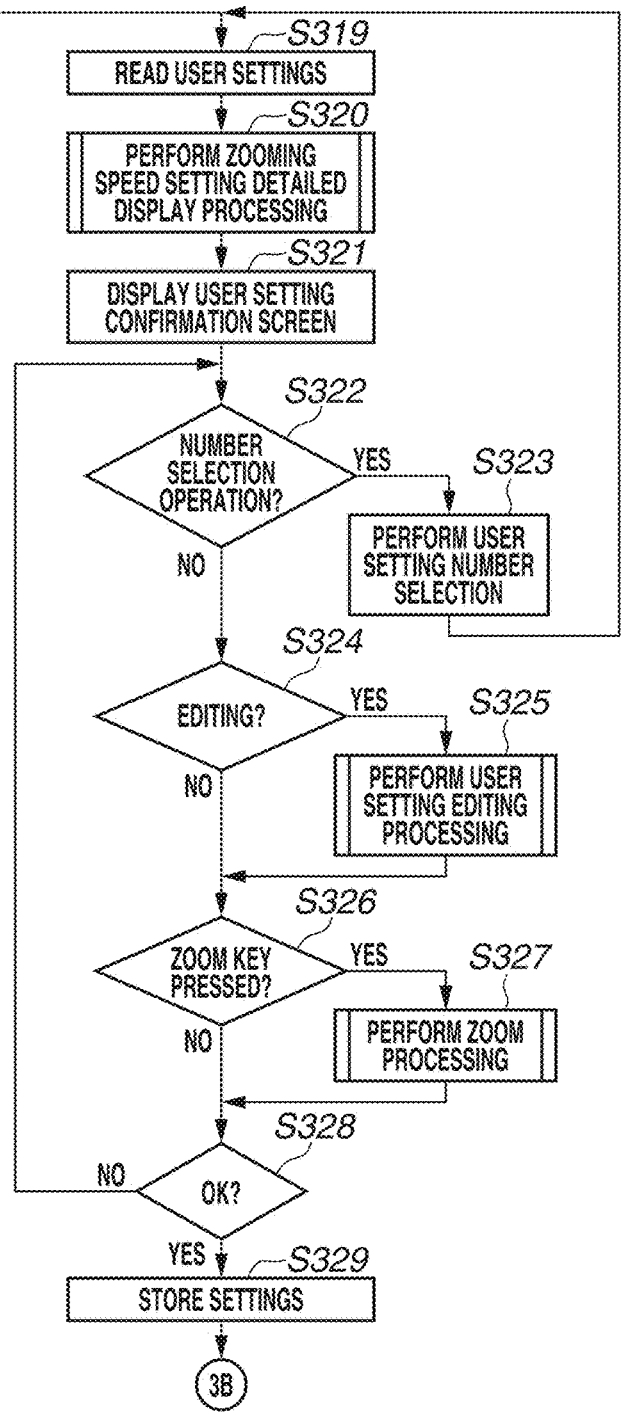

FIGS. 3A and 3B are a flowchart illustrating image capture mode processing by the digital camera 100. Processing of the flowchart illustrated in FIGS. 3A and 3B and the other flowcharts (described below) is implemented when a program recorded in the nonvolatile memory 56 is loaded into the system memory 52 and then executed by the system control unit 50. When the digital camera 100 is activated in the image capture mode, the system control unit 50 starts the processing of the flowchart illustrated in FIGS. 3A and 3B.

In step S301, the system control unit 50 starts live view (LV) image capturing via the imaging unit 203 and displays a recording standby screen including the LV image.

In step S302, the system control unit 50 performs zooming speed setting simplified display processing. The zooming speed setting simplified display processing will be described below with reference to FIG. 9. With this processing, when the zooming speed type is set as the user setting (user customization) type, the system control unit 50 superimposes zooming speed bars indicating a relative relation with the zooming speeds for the respective depression levels of the zoom key 104 customized by the user on the LV image.

In step S303, the system control unit 50 determines whether the menu button included in the operation unit 70 is pressed (whether a menu display instruction is issued).

When the menu button is pressed (YES in step S303), the processing proceeds to step S311. On the other hand, when the menu button is not pressed (NO in step S303), the processing proceeds to step S304.

In step S304, the system control unit 50 determines whether the zoom key 104 is pressed. When the zoom key 104 is pressed (YES in step S304), the processing proceeds to step S305. On the other hand, when the zoom key 104 is not pressed (NO in step S304), the processing proceeds to step S306. In step S305, the system control unit 50 performs zoom processing at the zooming speed corresponding to the depression amount of the zoom key 104. The zoom processing will be described below with reference to FIG. 7.

In step S306, the system control unit 50 determines whether a REC button (image capturing instruction key) included in the operation unit 70 is pressed. When the REC button is pressed (YES in step S306), the processing proceeds to step S307. On the other hand, when the REC button is not pressed (NO in step S306), the processing proceeds to step S310. In step S307, the system control unit 50 determines whether a movie is currently being recorded. When a movie is being recorded (YES in step S307), the processing proceeds to step S309. On the other hand, when a movie is not being recorded (i.e., in the recording stopped or recording standby state) (NO in step S307), the processing proceeds to step S308. In step S308, the system control unit 50 starts recording processing (main image capturing, REC) for recording a movie captured by the imaging unit 203 in the recording medium 200 as a moving image file. In step S309, the system control unit 50 stops recording the movie and performs processing for closing the recorded moving image file. Then, the system control unit 50 enters the recording standby state. When the REC button is pressed during movie recording standby (in the recording stopped state, STBY), the system control unit 50 starts recording. When the REC button is pressed during recording, the system control unit 50 stops movie recording.

In step S310, the system control unit 50 determines whether an image capture mode processing end event has occurred. End events include power-OFF by depression of the power switch 215, power-OFF due to power voltage drop, and a shift to the playback mode. When an end event has occurred (YES in step S310), the system control unit 50 ends the image capture mode processing. On the other hand, when no end event has occurred (NO in step S310), the processing returns to step S303.

In step S311, the system control unit 50 displays a menu screen on the display unit 28. The menu screen displays a menu including a plurality of menu items for making various settings related to the digital camera 100. By scrolling the menu screen or selecting a tab, the user can display a part of the plurality of menu items not fit in one screen.

Figure 4A:
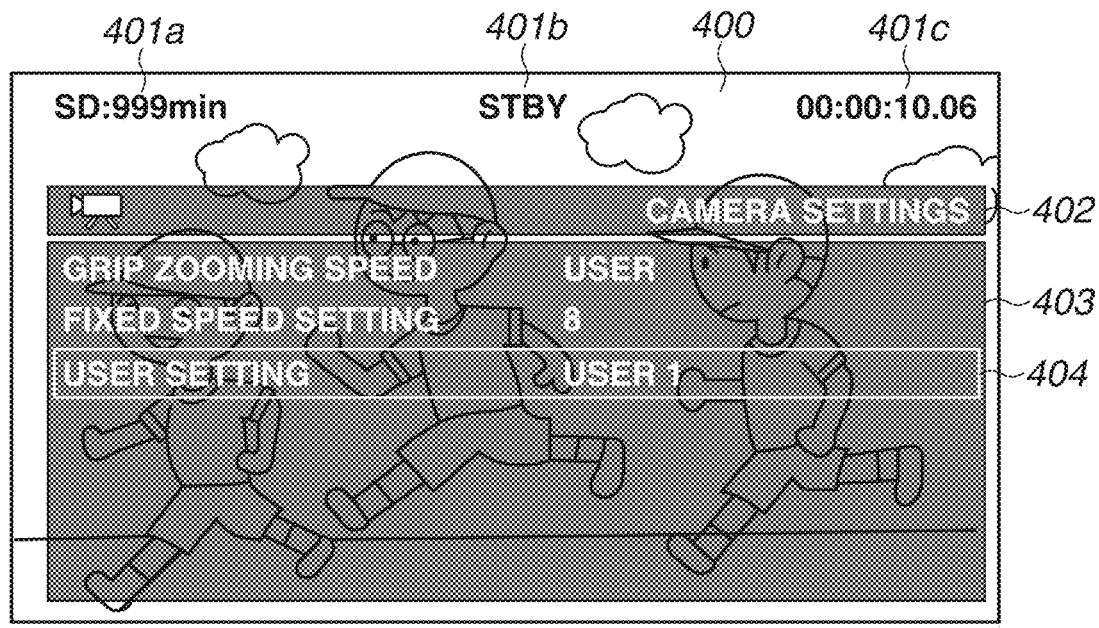
FIGS. 4A and 4B illustrate display examples of menu screens on a display unit.

FIG. 4A illustrates display examples of menu screens. FIG. 4A illustrates a display example of a portion including a menu item 403 for setting the zooming speed type and a menu item 404 for selecting the user setting number for zooming speed customization out of menus related to camera settings. The menu screen is superimposed on the recording standby screen in which a recordable time 401a, a recording state 401b, and a recordable time 401c are superimposed on a LV image 400. The menu item 403 ("grip zooming speed") is an item for setting what zooming speed assignment pattern is to be used to perform a zoom drive when the zoom key 104 is operated. Settable options include "USER" (user setting or user customization) speed zoom, variable-speed zoom, and fixed-speed zoom. The "USER" (user setting or user customization) speed zoom is a zooming speed type with which a zoom drive is performed at the zooming speed set by the user for each depression amount (push-down amount, push-down degree, pressure, or depression amount) of the zoom key 104 or a preset zooming speed. The user can make setting to achieve a different zooming speed for each depression amount, or make setting to perform a zoom drive at the same zooming speed regardless of the depression amount. The variable-speed zoom is a zooming speed type with which a zoom drive is performed at a different zooming speed for each push-down amount pre-assigned to the push-down amount of the zoom key 104. the fixed-speed zoom is a zooming speed type with which a zoom drive is performed at a fixed zooming speed while the zoom key 104 is being pressed regardless of the push-down amount of the zoom key 104. More specifically, fixed-speed zoom is a zooming speed type with which a zoom drive is performed at the same zooming speed for all push-down amounts pre-assigned the same zooming speed for all push-down amounts of the zoom key 104. The menu item 404 ("USER SETTING") is an item for setting which pattern of a plurality of setting patterns (user-set patterns or preset patterns) is to be used when the zooming speed type is "USER". According to the present exemplary embodiment, the menu item 404 can be set to one of three options, user 1, user 2, and user 3 (user setting number 1 to 3). More specifically, according to the present exemplary embodiment, the user can register three different zooming speed patterns for each depression amount of the zoom key 104. When the menu item 404 is enabled when the menu item 403 is set to "USER". The menu item 404 is displayed in gray (disabled) when the menu item 403 is set to the other options (variable-speed zoom or fixed-speed zoom).

In step S312, the system control unit 50 determines whether a zooming speed type change instruction is issued. As described above, the zooming speed type can be selected by selecting the menu item 403. More specifically, the zooming speed type can be changed by pressing the right or left key (hereinafter, collectively referred to as a right-and-left key) included in the operation unit 70 in a state where the selection cursor is positioned at the menu item 403. When the zooming speed type change instruction is issued (YES in step S312), the processing proceeds to step S313. On the other hand, when the instruction is not issued (NO in step S312), the processing proceeds to step S314. In step S313, based on the zooming speed type change instruction, the system control unit 50 sets any one of the "USER" (user setting or user customization) speed zoom, the variable-speed zoom, and the fixed-speed zoom.

In step S314, the system control unit 50 determines whether the current zooming speed type is set to user setting ("USER"). When the current zooming speed type is set to user setting (YES in step S314), the processing proceeds to step S315. On the other hand, when the current zooming speed type is not set to user setting (NO in step S314), the processing proceeds to step S316. In step S315, the system control unit 50 determines whether the SET button included in the operation unit 70 is pressed in a state where the item "USER SETTING" (menu item 404) is selected (in a state where the selection cursor is positioned at the item). When the SET button is pressed in a state where the item "USER SETTING" is selected (YES in step S315), the processing proceeds to step S319. On the other hand, when the SET button is not pressed in a state where the item "USER SETTING" is selected (NO in step S315), the processing proceeds to step S316.

In step S316, the system control unit 50 determines whether other operations are performed. Other operations include an operation for moving the selection cursor for menu item selection (an operation of an up-and-down key included in the operation unit 70) and a setting operation in a state where another menu item is selected. In step S317, the system control unit 50 performs processing corresponding to other operations. For example, in response to a down key operation, the selection cursor is moved to select the menu item under the currently selected one.

In step S318, the system control unit 50 determines whether a menu screen ending instruction is issued (whether a menu clear operation is performed). When the menu screen ending instruction is issued (YES in step S318), the system control unit 50 does not display the menu screen, and the processing returns to step S301. In step S301, the system control unit 50 displays the recording standby screen. On the other hand, when the menu screen ending instruction is not issued (NO in step S318), the processing returns to step S312.

In step S319, the system control unit 50 reads from the nonvolatile memory 56 the zooming speed setting value (registered setting pattern) for each depression amount (depression level) of the zoom key 104 corresponding to the user setting number set for the current menu item 404.

In step S320, the system control unit 50 performs zooming speed setting detailed display processing. The zooming speed setting detailed display processing will be described below with reference to FIG. 5.

In step S321, the system control unit 50 displays a user setting confirmation screen on the display unit 28. FIGS. 4C-1, 4D-1, and 4E-1 illustrate display examples of the user setting confirmation screen. FIGS. 4C-1, 4D-1, and 4E-1 illustrate display examples of a zooming speed setting pattern confirmation screen for the respective depression levels of the zoom key 104 registered in "USER SETTING 1", "USER SETTING 2", and "USER SETTING 3". Referring to FIGS. 4C-1, 4D-1, and 4E-1, a user setting number 405 is the user setting number as the identification number of the setting pattern currently displayed. An OK button 406 is a display item as an option for changing the setting pattern currently displayed and ending the confirmation screen. An EDIT button 407 is a display item as an option for changing to a screen for editing the setting pattern currently displayed (a screen for changing the zooming speed settings for the respective depression levels). The user can select the user setting number 405, the OK button 406, or the EDIT button 407 by moving the selection cursor. In addition, the LV image 400, the recordable time 401*a*, the recording state 401*b*, and the recordable time 401*c* are displayed on the background. A zoom bar 408 indicating the current zoom position is displayed in response to the start of the operation of the zoom key 104 and undisplayed when a predetermined period has elapsed after the operation ends. Referring to the zoom bar 408, the left end corresponds to the wide-angle end, and the right end thereof corresponds to the telephoto end. The position of the longwise index indicates the current zoom position. When the user performs optical zoom by operating the zoom key 104, the position of the index moves according to the zoom position.

Referring to FIGS. 4C-1, 4D-1, and 4E-1, a zooming speed bar display area 410 displays zooming speed bars as display elements for representing the zooming speed setting values. When the zoom key 104 is pressed with each depression level, each zooming speed bar represents the zooming speed setting value in terms of the height of a bar-like rectangle. Each of the "zooming speed bars" is one display element (display item). Hereinafter, the zooming speed bars may be simply referred to as "speed bars". Dotted lines indicating the zooming speed bar display area 410 are drawn for convenience' sake, and are not actually displayed on the display unit 28. Hereinafter, pressing the zoom key 104 with the depression levels 1 to 5 toward the wide-angle side refers to pressing it with the depression levels −1 to −5, respectively. The depression levels −1 to −5 correspond to the absolute values of the same depression amount (pressure, depression degree, operation degree) as the depression levels 1 to 5 of the zoom key 104 when pressed toward the telephoto side. The direction of a zoom drive is the wide-angle side opposite to the telephoto side (the push-down position is not the first operation portion 105*a* but the second operation portion 105*b*).

Referring to FIGS. 4C-1, 4D-1, and 4E-1, a zooming speed numerical value display area 430 numerically displays the zooming speed setting values (in 17 steps from 0 to 16) when the zoom key 104 is pressed with each depression level. Each numerical value displayed in the zooming speed numerical value display area 430 is immediately below the corresponding zooming speed bar displayed in the zooming speed bar display area 410. Dotted lines indicating the zooming speed numerical value display area 430 are drawn for convenience' sake, and are not actually displayed on the display unit 28.

The above-described user setting confirmation screen enables the user to confirm the relation between the depression degree of the zoom key 104 and the zooming speed. Each display element in the zooming speed bar display area 410 and the zooming speed numerical value display area 430 will be described below with reference to FIGS. 6A to 6E.

At the time of shipment of the digital camera 100, three different preset patterns are stored in the nonvolatile memory 56 in association with the user setting numbers 1 to 3. The preset patterns can be called by setting each user setting number before editing the setting pattern of each user setting number or by performing a reset operation during editing of each user setting number. Therefore, if no editing (customization) operation has been performed or if a reset operation has been performed for each user setting number, the preset pattern prestored for each user setting number is displayed on the user setting confirmation screen. When editing is performed, the setting pattern to be registered to the target user setting number has been changed and become no longer a preset pattern. In this case, however, the preset pattern remains stored in the nonvolatile memory 56 and can be registered again through a reset operation.

In step S322, the system control unit 50 determines whether a user setting number selection instruction is issued. The user setting number selection instruction can be issued by pressing the right-and-left key in a state where the user setting number 405 is selected by the selection cursor. When the user setting number selection instruction is issued (YES in step S322), the processing proceeds to step S323. On the other hand, when the user setting number selection instruction is not issued (NO in step S322), the processing proceeds to step S324. In step S323, the system control unit 50 selects the user setting number in response to the selection operation performed in step S322. For example, when a selection operation by the left key is performed in a state where USER SETTING 1 is set, USER SETTING 3 is set. When a selection operation by the right key is performed in a state where USER SETTING 1 is set, USER SETTING 2 is set. After the system control unit 50 selects the user setting number in step S323, the processing returns to step S319. In step S319, the system control unit 50 reads the setting pattern registered to the selected user setting number. The system control unit 50 performs processing in steps S320 and S321 based on the read setting pattern to update the user setting confirmation screen.

In step S324, the system control unit 50 determines whether a setting pattern editing instruction is issued. The editing instruction is issued when the SET button included in the operation unit 70 is pressed in a state where the EDIT button 407 is selected by the selection cursor. When the editing instruction is issued (YES in step S324), the processing proceeds to step S325. On the other hand, when the editing instruction is not issued (NO in step S324), the processing proceeds to step S326. In step S325, the system control unit 50 performs user setting editing processing (customization processing) based on the setting pattern currently displayed. The user setting editing processing will be described below with reference to FIG. 8.

In step S326, the system control unit 50 determines whether the zoom key 104 is pressed. When the zoom key 104 is pressed (YES in step S326), the processing proceeds to step S327. On the other hand, when the zoom key 104 is not pressed (NO in step S326), the processing proceeds to step S328. In step S327, the system control unit 50 performs the zoom processing at the zooming speed corresponding to the depression amount of the zoom key 104. The zoom processing will be described below with reference to FIG. 7.

In step S328, the system control unit 50 determines whether the OK button 406 is operated (the SET button included in the operation unit 70 is pressed in a state where the OK button 406 is selected by the selection cursor). When the OK button 406 is operated (YES in step S328), the processing proceeds to step S329. On the other hand, when the OK button 406 is not operated (NO in step S328), the processing returns to step S322. In step S329, the system control unit 50 determines the current user setting number displayed last in the user setting confirmation screen as the current setting and records the setting in the nonvolatile memory 56. Subsequently, the system control unit 50 undisplays the user setting confirmation screen. Then, the processing returns to step S311. In step S311, the system control unit 50 displays the menu screen. Although omitted in FIGS. 3A and 3B, in the user setting confirmation screen, the system control unit 50 moves the selection cursor to any one of the user setting number 405, the OK button 406, and the EDIT button 407 in response to an operation on the up-and-down key included in the operation unit 70. In addition, a still image may also be captured.

Preset patterns illustrated in FIGS. 4C-1, 4D-1, and 4E-1 will be described in detail below.

Figure 4B:
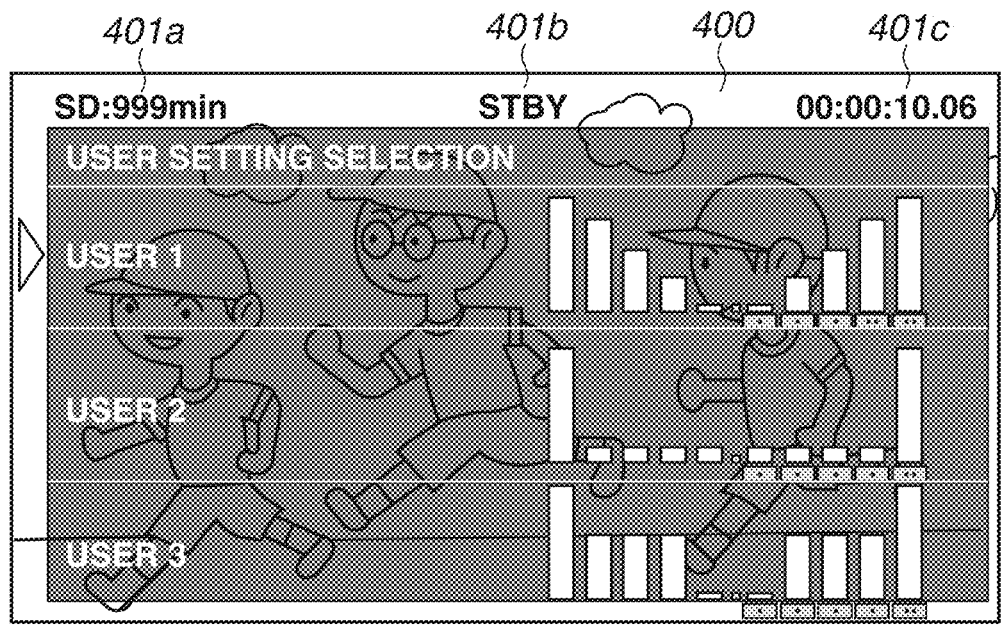
Figures 1, 4C:
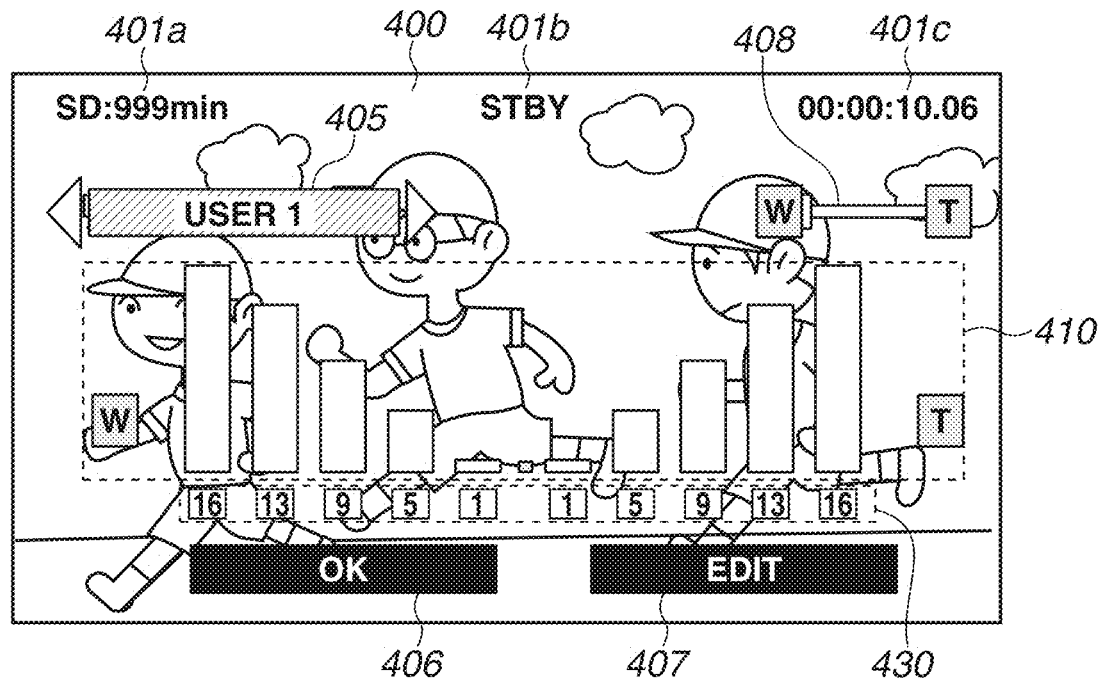
Figures 2, 4C:
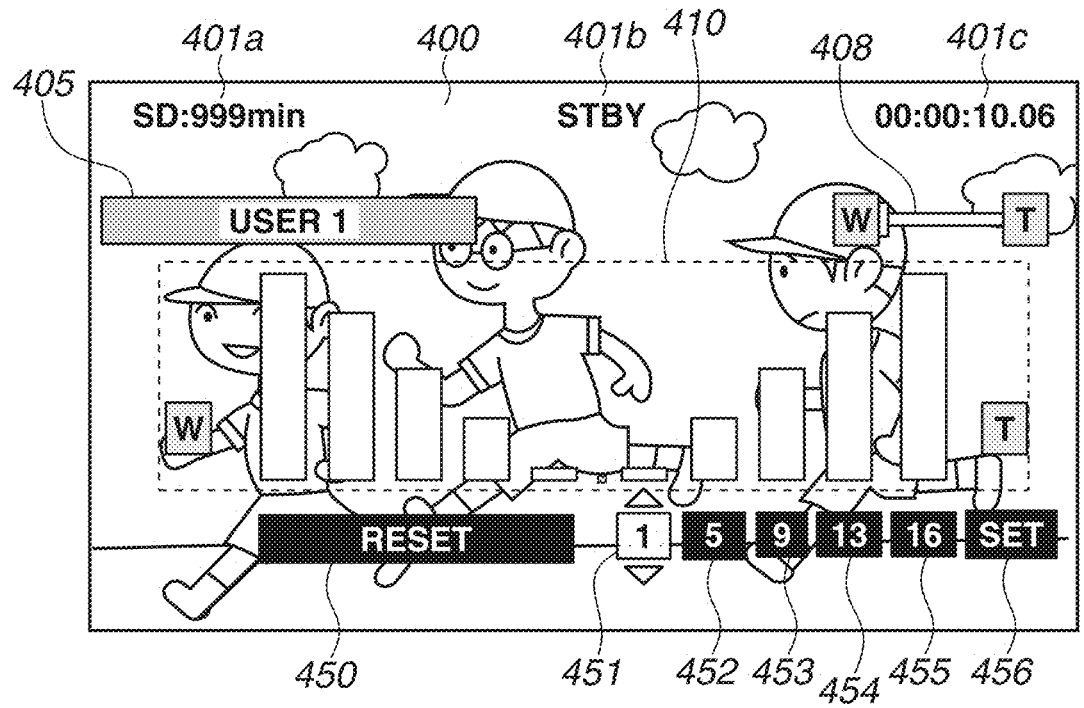

In the preset pattern illustrated in FIG. 4C-1 (preset pattern 1), zooming speeds "1, 5, 9, 13, 16", respectively are assigned to the depression levels 1 to 5. In this preset pattern, the depression levels −1 to −5 perform zooming at the same zooming speed as the depression levels 1 to 5, respectively, in the opposite direction. The minimum value of the depression level (depression level 1) is assigned a minimum zoom-drivable speed (1), and the maximum value of the depression level (depression level 5) is assigned a maximum zoom-drivable speed (16). The other depression levels are set such that the increased amount of the depression level is approximately proportional to the increased amount of the zooming speed (the speed difference between adjacent levels is 3 or 4 and is set to the same numerical value as possible). According to the preset pattern 1, lightly pressing the zoom key 104 performs low-speed zooming, strongly pressing the zoom key 104 performs high-speed zooming, and moderately pressing the zoom key 104 performs medium-speed zooming. Since the variation of the zooming speed is approximately proportional to the depression force, it is easy for the user to understand the relation between the zooming speed and the depression force. Therefore, this present pattern is useful for the user who wants to frequently change the zooming speed (from low to high speeds) depending on a scene.

Figures 1, 4D:
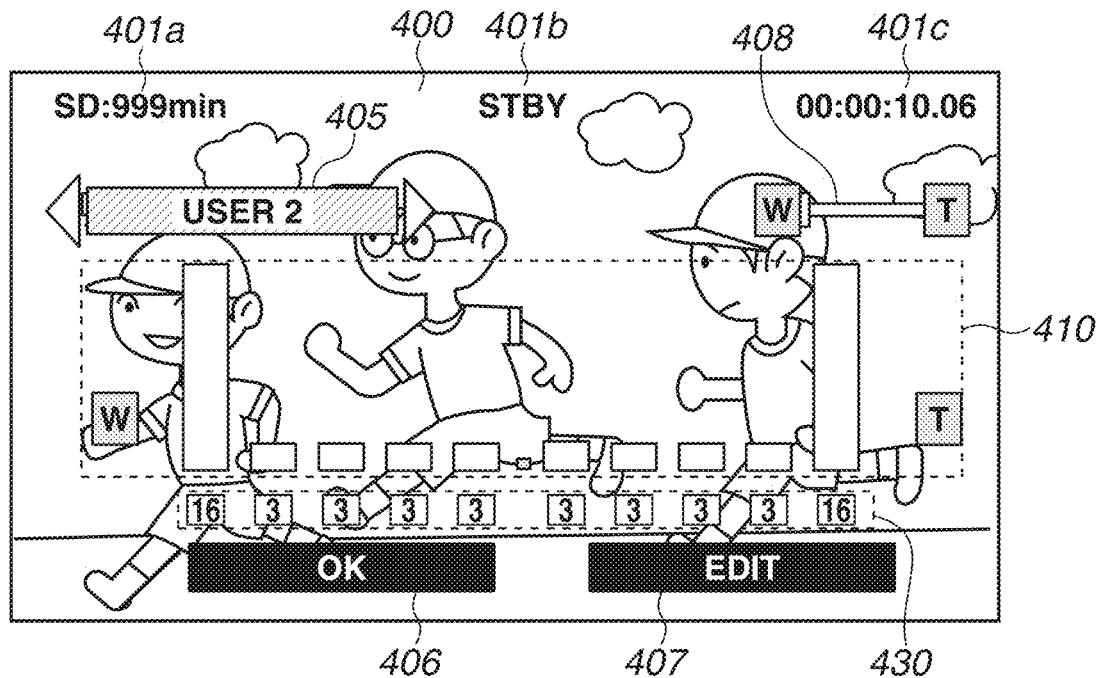
Figures 2, 4D:
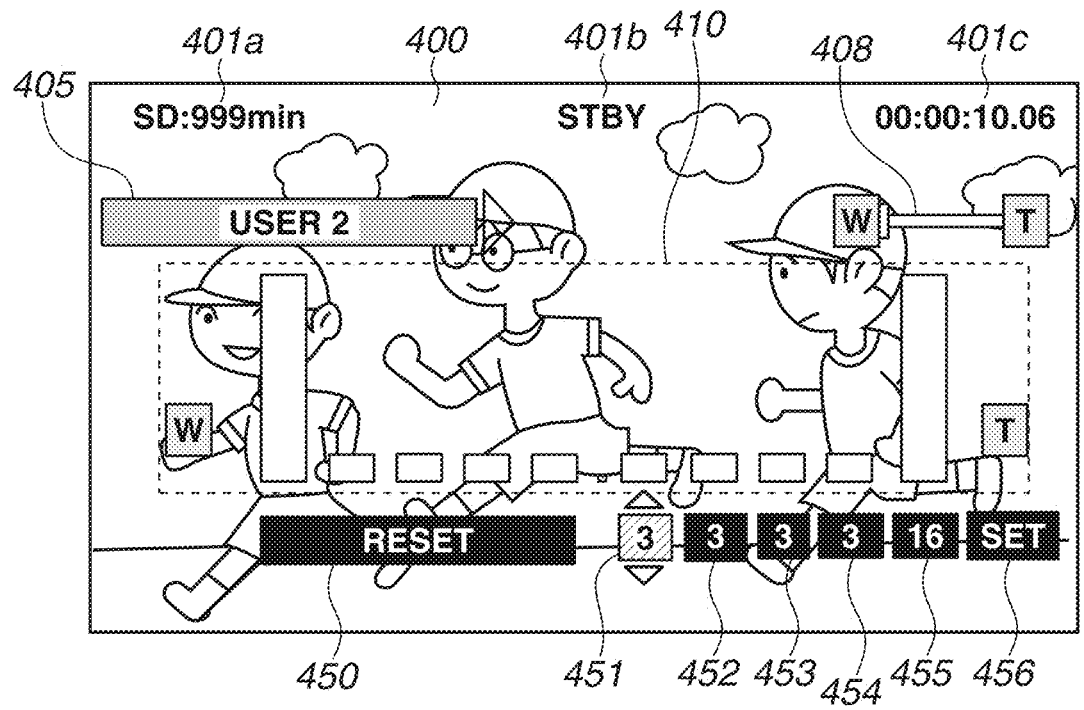

In the preset pattern illustrated in FIG. 4D-1 (preset pattern 2), the depression levels 1 to 5 are assigned zooming speeds "3, 3, 3, 3, 16", respectively. In this preset pattern, the depression levels −1 to −5 perform zooming at the same zooming speed as the depression levels 1 to 5, respectively, in the opposite direction. The depression levels 1 to 4 are assigned the same comparatively low zooming speed (3). The maximum value of the depression level (depression level 5) is assigned the maximum zoom-drivable speed (16). According to the preset pattern 2, pressing the zoom key 104 all the way until it stops performs maximum-speed zooming, and pressing the zoom key 104 not all the way until it stops (with the depression level 4 or less) performs zooming at a comparatively low constant speed. Pressing the zoom key 104 not all the way until it stops easily performs zooming at a comparatively low constant speed and therefore enables preventing a movie from becoming hard to view because of frequently changing the zooming speed. Only when the user wants to perform fast zooming, the user can perform high-speed zooming by pressing the zoom key 104 all the way until it stops. For this reason, the preset pattern 2 is preferable in a case where the user basically wants to perform fixed-speed zooming and also needs to perform fast zooming depending on the situation. This preset pattern is suitable, for example, for an operation where fixed-speed zooming is performed during movie capturing (during recording) to maintain the quality level of the movie being recorded, and fast zooming is performed in the movie recording stopped state (recording standby state) to prepare for the next capturing. Although the zooming speed (3) has been described above as an example of zooming at a comparatively low zooming speed, another value may be set as long as the zooming speed is equal to or less than the half (8) of the maximum settable value (16).

Figures 1, 4E:
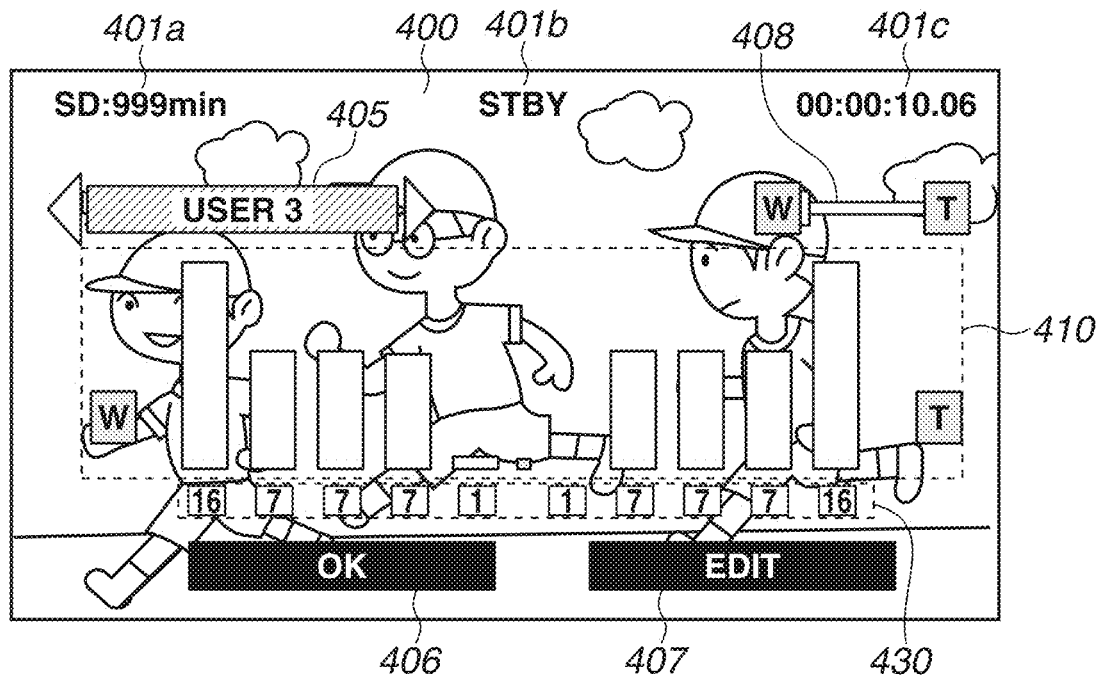
Figures 2, 4E:
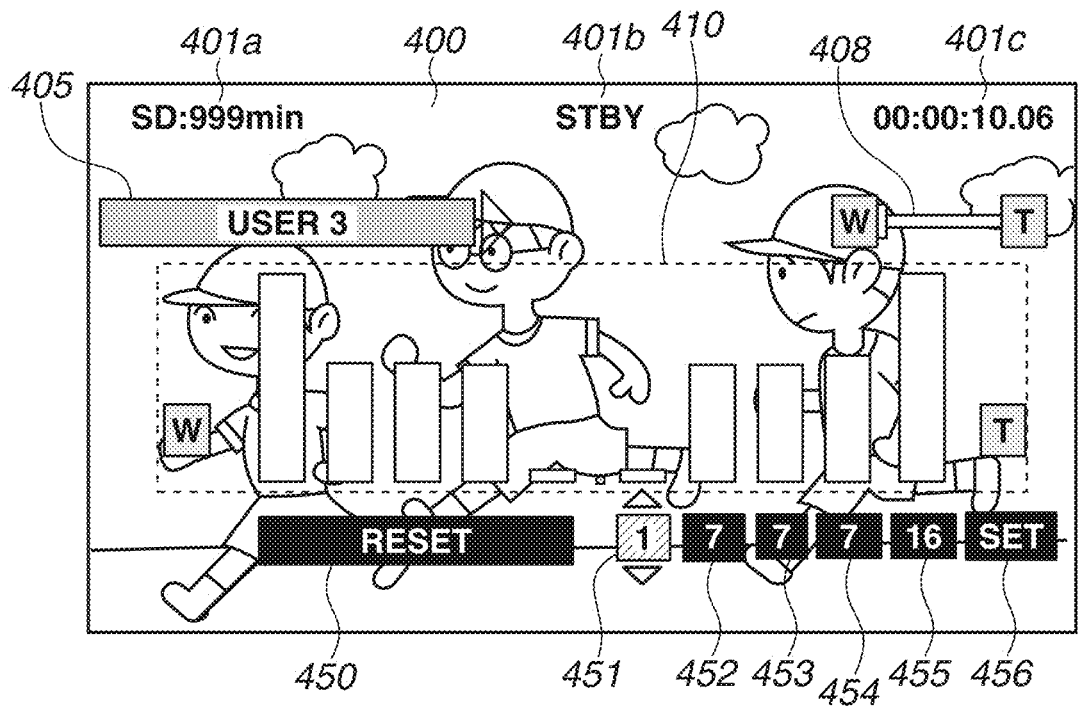

In the preset pattern illustrated in FIG. 4E-1 (preset pattern 3), the depression levels 1 to 5 are assigned zooming speeds "3, 7, 7, 7, 16", respectively. In this preset pattern, the depression levels −1 to −5 perform zooming at the same zooming speed as the depression levels 1 to 5, respectively, in the opposite direction. The depression level 1 as the lowest level is assigned a comparatively low zooming speed (3). The depression levels 2 to 4 are assigned the same medium zooming speed (7). The maximum value of the depression level (depression level 5) is assigned the maximum zoom-drivable speed (16). According to the preset pattern 3, pressing the zoom key 104 all the way until it stops performs zooming at the maximum speed, and very lightly pressing the zoom key 104 performs zooming at a comparatively low speed. Pressing the zoom key 104 with a depression level in a wide range of the medium depression levels performs zooming leaving the zooming speed unchanged, making it easier to perform fixed-speed zooming. Basically, it is suitable to use the preset pattern 3 for similar scenes to the preset pattern 2, and the preset pattern 3 is particularly suitable in a case where at least the low zooming speed (3) and the zooming speed (7) slightly higher than the zooming speed (3) are to be selectively used. A zooming speed slightly higher than the low speed is equal to or lower than the half of the zooming speed 16 as the maximum assignable speed. This slightly high zooming speed does not make a movie hard to view even if the low speed and the speed slightly higher than the low speed are selectively used during movie recording. Although the preset pattern 3 has been described above centering on zooming speeds "3, 7, 7, 7, 16", zooming speeds "1, 5, 5, 5, 16" and zooming speeds "0, 7, 7, 7, 16" are also applicable. In the case of "1, 5, 5, 5, 16", zooming is performed at the non-zero minimum speed (speed with the minimum value) when the zoom key 104 is pressed with the lowest depression amount. In the case of "0, 7, 7, 7, 16", no operation results when the zoom key 104 is pressed with the lowest depression amount. Providing such a setting as "0, 7, 7, 7, 16" enables handling the initial depression (depression amount 1 to 25) as a non-sensitive range. This makes it possible to prevent zooming from being unintentionally performed when the user only lightly touches the zoom key 104.

The user setting confirmation screen is not limited to the examples illustrated in FIGS. 4C-1, 4D-1, and 4E-1. A screen displaying the three different user settings on the same screen, such as the one illustrated in FIG. 4B, is also applicable. This screen displays user settings 1 to 3 and zooming speed bars indicating the setting statuses of the user settings on the same screen. Any one user setting is selected by moving the triangle cursor on the left-hand side up and down. When the user presses the SET button included in the operation unit 70, the user setting editing screen for the selected user setting is displayed.

Figure 5:
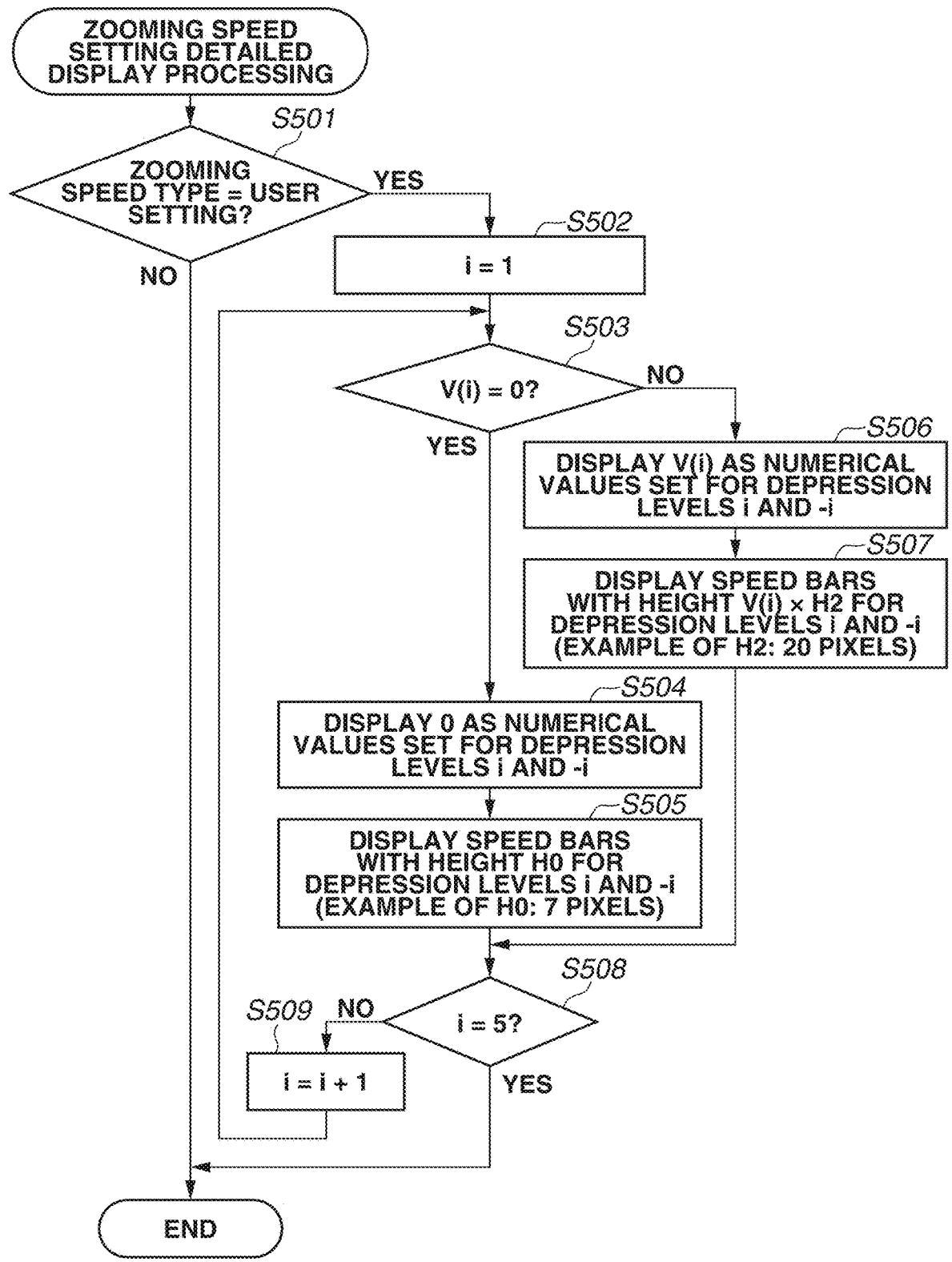
FIG. 5 is a flowchart illustrating zooming speed setting detailed display processing.

FIG. 5 is a detailed flowchart illustrating the zooming speed setting detailed display processing in step S320 illustrated in FIG. 3B. This processing displays each display element in the zooming speed bar display area 410 and the zooming speed numerical value display area 430.

In step S501, the system control unit 50 refers to the setting information stored in the nonvolatile memory 56 to determine whether the zooming speed type is set to the user setting ("USER"). When the zooming speed type is set to the user setting (YES in step S501), the processing proceeds to step S502. On the other hand, when the zooming speed type is not set to the user setting (NO in step S501), the processing exits the flowchart. More specifically, when the zooming speed type is not set to the user setting, the zooming speed bar display area 410 and the zooming speed numerical value display area 430 are not displayed.

In step S502, the system control unit 50 initializes to 1 a variable i to be used as a counter for each depression level.

In step S503, the system control unit 50 determines whether a speed V(i) assigned to the depression level i is 0. When the speed V(i) is 0 (YES in step S503), the processing proceeds to step S504. On the other hand, when the speed V(i) is not 0 (NO in step S503), the processing proceeds to step S506.

In step S504, the system control unit 50 displays the speed numerical value 0 at the positions corresponding to the depression levels i and −i in the zooming speed numerical value display area 430.

In step S505, the system control unit 50 displays a bar-like rectangle (speed bar) with a height H0 at the positions corresponding to the depression levels i and −i in the zooming speed bar display area 410. H0 is, for example, 7 pixels.

In step S506, the system control unit 50 displays the numerical value of the speed V(i) at the positions corresponding to the depression levels i and −i in the zooming speed numerical value display area 430.

In step S507, the system control unit 50 displays a bar-like rectangle with a height V(i)*H2 at the positions corresponding to the depression levels i and −i in the zooming speed bar display area 410. H2 is larger than H0 and is, for example, 20 pixels. For example, when the zooming speed V(i) assigned to the depression level i is 3, a bar-like rectangle with a height of 3*20=60 pixels is displayed.

In step S508, the system control unit 50 determines whether the variable i reaches 5 as the maximum value of the depression level. When the variable i does not reach 5 (NO in step S508), the processing proceeds to step S509. In step S509, the system control unit 50 increments the variable i by 1. Then, the processing returns to step S503. On the other hand, when the variable i reaches 5 (YES in step S508), the speed numerical values and speed bars have been displayed for all of the depression levels. Then, the processing exits the flowchart. Speed bars in the zooming speed bar display area 410 and speed numerical values in the zooming speed numerical value display area 430, as illustrated in FIGS. 4C-1, 4D-1, and 4E-1, are displayed in this way.

FIGS. 6A to 6E illustrate transitions of a depression amount index for the zoom key 104 and speed bars displayed in response to the depression of the zoom key 104. FIGS. 6A to 6E illustrate only the portions of the zooming speed bar display area 410 and the zooming speed numerical value display area 430 illustrated in FIGS. 4A to 4E-2. Referring to FIGS. 6A to 6E, the LV image is omitted. An icon 416 is a guide which indicates that speed bars 411 to 415 and numerical areas 431 to 435 on the right-hand side correspond to an operation toward the telephoto side. An icon 426 is a guide which indicates that speed bars 421 to 425 and numerical areas 441 to 445 on the left-hand side correspond to an operation toward the wide-angle side. The speed bars 411 to 415 correspond to the depression levels 1 to 5, respectively, toward the telephoto side. The speed bars 421 to 425 correspond to the depression levels −1 to −5, respectively, toward the wide-angle side. The numerical areas 431 to 435 correspond to the depression levels 1 to 5, respectively, toward the telephoto side. The numerical areas 441 to 445 correspond to the depression levels −1 to −5, respectively, toward the wide-angle side. An index 420 indicates the depression amount of the zoom key 104 when pressed at a horizontal position in finer units than the depression levels.

Figure 6A:
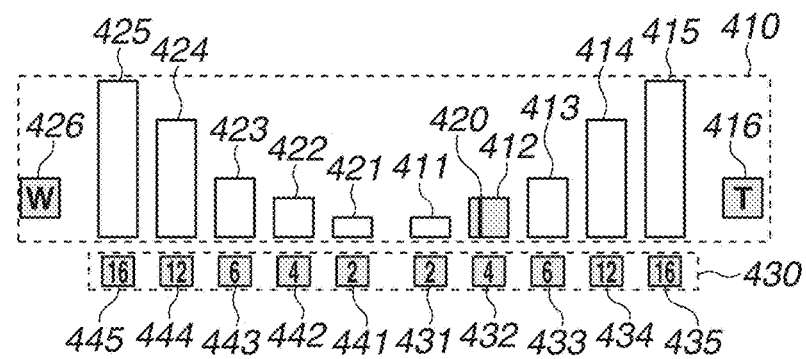
FIGS. 6A to 6E illustrate transitions of index and speed bar display in response to depression of a zoom key.
Figure 6B:
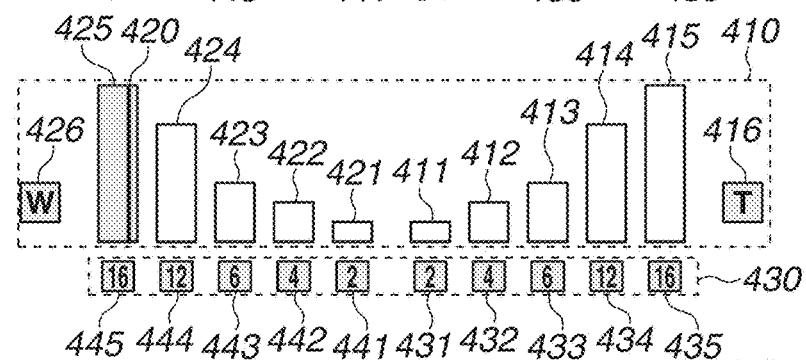

FIGS. 6A and 6B illustrate an example where the depression levels 1 to 5 are assigned zooming speeds "2, 4, 6, 12, 16", respectively. Under the above-described assignment situation, pressing the zoom key 104 with the depression amount corresponding to the depression level 2 toward the telephoto side (pressing the first operation portion 105a) results in the display illustrated in FIG. 6A. Referring to FIG. 6A, the index 420 is displayed inside the speed bar 412 corresponding to the depression level 2, to the left of the center of the speed bar 412. This means that the current depression amount is a weak-side amount in the depression level 2 (weaker than the central value in the depression level 2). Therefore, weakening the depression degree to a further extent will cause a shift to the depression level 1, decreasing the zooming speed. Conversely, even slightly strengthening the depression degree leaves the zooming speed unchanged, making it easier to maintain the zooming speed since there is a margin up to the depression level 3. In this case, the speed bar 412 corresponding to the depression level 2 is highlighted unlike the other speed bars, enabling the user to recognize that zooming is currently controlled at the zooming speed corresponding to the speed bar 412. For example, the speed bar 412 is displayed in orange as a highlight display, and the other speed bars are displayed in white as a normal display.

When the zoom key 104 is pressed with the depression amount corresponding to the depression level −5 toward the wide-angle side (when the second operation portion 105b is pressed), speed bars are displayed as illustrated in FIG. 6B. The index 420 is displayed inside the speed bar 425 corresponding to the depression level −5, to the right of the center of the speed bar 425. This means that the current depression amount is a weak-side amount in the depression level −5 (weaker than the central value in the depression level −5). Therefore, weakening the depression degree to a further extent will cause a shift to the depression level −4, decreasing the zooming speed. The speed bar 425 corresponding to the depression level −5 is highlighted unlike the other speed bars, enabling the user to recognize that zooming is currently controlled at the zooming speed corresponding to the speed bar 425.

Figure 6C:
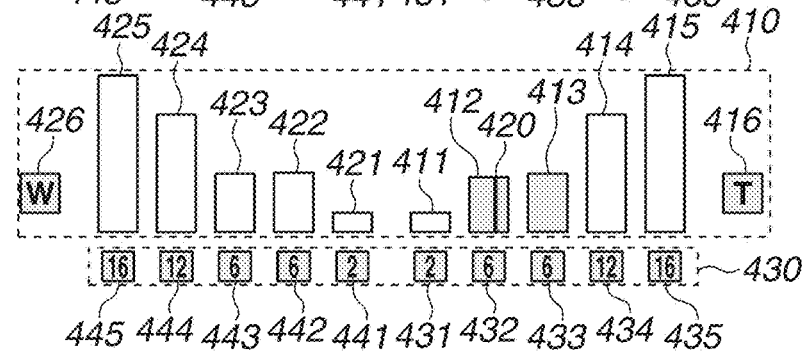

FIG. 6C illustrates an example where the depression levels 1 to 5 are assigned zooming speeds "2, 6, 6, 12, 16", respectively. More specifically, the depression levels 2 and 3 are assigned the same zooming speed. Under the above-described assignment situation, pressing the zoom key 104 with the depression amount corresponding to the depression level 2 toward the telephoto side results in the display illustrated in FIG. 6C. Referring to FIG. 6C, the index 420 is displayed inside the speed bar 412 corresponding to the depression level 2, to the right of the center of the speed bar 412. This means that the current depression amount is a strong-side amount in the depression level 2 (stronger than the central value in the depression level 2). The speed bar 412 corresponding to the depression level 2 is highlighted unlike the other speed bars. In addition, the speed bar 413 corresponding to the depression level 3 assigned the same zooming speed as the depression level 2 is displayed in a similar display format to the speed bar 412, i.e., the speed bar 413 is highlighted unlike the other speed bars. Thus, not only the speed bar of the depression level corresponding to the current depression amount but also the speed bars corresponding to other depression levels assigned the same zooming speed are also highlighted. This display enables the user to recognize the depression level corresponding to the current depression amount and other depression levels assigned the same zooming speed. In a case where zooming speeds are arranged in ascending order, i.e., in ascending order of the depression level (more specifically, in order of the operation amount), like the present exemplary embodiment, the user can easily confirm the range of the same setting value (zooming speed) (the range of the depression levels 2 and 3). In addition, the user can easily identify changing points between different setting values (the point where the depression level 1 changes to 2, and the point where the depression level 3 changes to 4). If the user recognizes that a plurality of depression levels corresponds to the current depression amount as illustrated in FIG. 6C, the user can recognize that there arises no problem even if the depression amount slightly changes in order to perform fixed-speed zooming while maintaining the current zooming speed. For example, under the assignment situation illustrated in FIG. 6C, the user can recognize that the zooming speed remains unchanged even if the depression amount is increased to the next depression level. Therefore, the user recognizes that the user does not need to operate the zoom key 104 so carefully in order to keep the zooming speed. More specifically, in a case where the user wants to maintain the zooming speed, there arises no problem if the user slightly increases the depression amount to change the depression level to the next depression level. In this case, therefore, the user recognizes that the user needs to maintain the current depression amount, being careful only not to decrease the depression amount. This makes it easier to perform an operation for maintaining the zooming speed. On the contrary, if the user wants to increase the zooming speed, the user recognizes that the user needs to raise the depression amount by two steps from the current depression level. If the user recognize that one depression level corresponds to the current depression amount, as illustrated in FIG. 6A, the user can recognize that the user needs to carefully maintain the current depression amount in order to perform fixed-speed zooming while maintaining the current zooming speed.

Figure 6D:
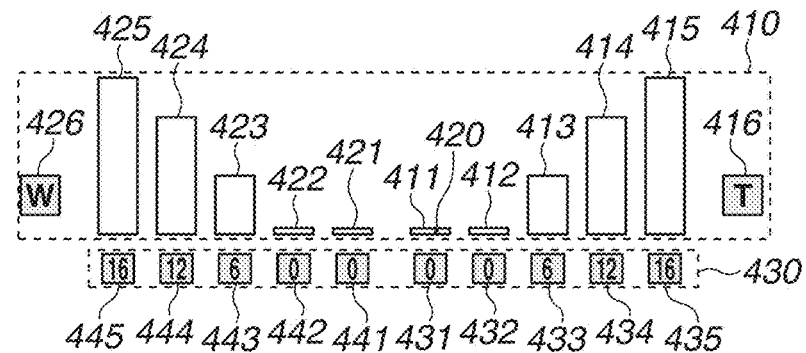

FIG. 6D illustrates an example where the depression levels 1 to 5 are assigned zooming speeds "0, 0, 6, 12, 16", respectively. More specifically, the depression levels 1 and 2 are assigned the same zooming speed "0". Under the above-described assignment situation, pressing the zoom key 104 with the depression amount corresponding to the depression level 1 toward the telephoto side results in the display illustrated in FIG. 6D. Referring to FIG. 6D, the index 420 is displayed inside the speed bar 411 corresponding to the depression level 1. This enables the user to recognize that the current depression amount corresponds to the depression level 1 and that, although a zoom drive is not performed, an operation for pressing the zoom key 104 has been correctly accepted by the digital camera 100. However, the speed bar 411 corresponding to the depression level 1 is displayed in a similar display format to the other speed bars and is not highlighted. The speed bar 412 corresponding to the depression level 2 assigned the same zooming speed as the depression level 1 is not highlighted, either. This is because the assigned zooming speed is 0, i.e., a zoom drive is not performed although the zoom key 104 is pressed. Although the user expects that a zoom drive is to be performed at the speed corresponding to the height of the speed bar 411, a zoom drive is not actually performed. Therefore, if the speed bar 411 is highlighted in this case, the user may incorrectly recognize the highlight display as a failure or other abnormal conditions of the digital cameras 100. However, since the speed bar 411 is not highlighted, the user can recognize the state of failure to perform a zoom drive not as an abnormal state but as a normal response. By setting a non-zero display height of the speed bars corresponding to the depression levels 1 and 2 assigned the zooming speed 0, it becomes possible to prevent the positions corresponding to the depression levels 1 and 2 from becoming blank and to clearly display the positions corresponding to the depression levels 1 and 2. In addition, the display position of the index 420 changes corresponding to the depression amount, enabling the user to recognize that the depression itself has been normally detected by the apparatus.

Figure 6E:
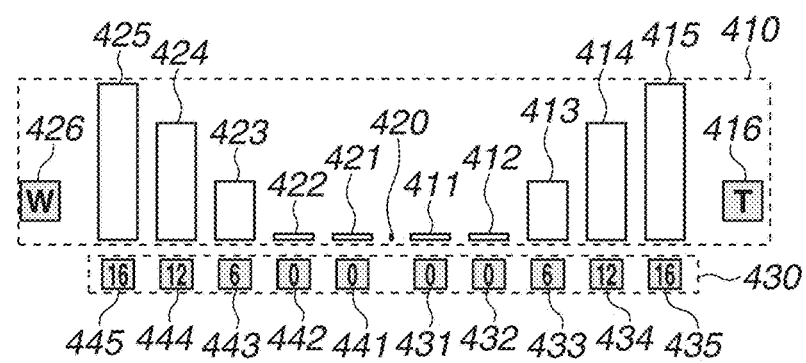

FIG. 6E illustrates a display example in case where the zoom key 104 is not pressed under an assignment situation that is the same as that illustrated in FIG. 6D. Since the index 420 is displayed at the horizontally central position outside all of the speed bars, the user can recognize that the depression of the zoom key 104 is not currently detected (depression amount 0).

Figure 7:
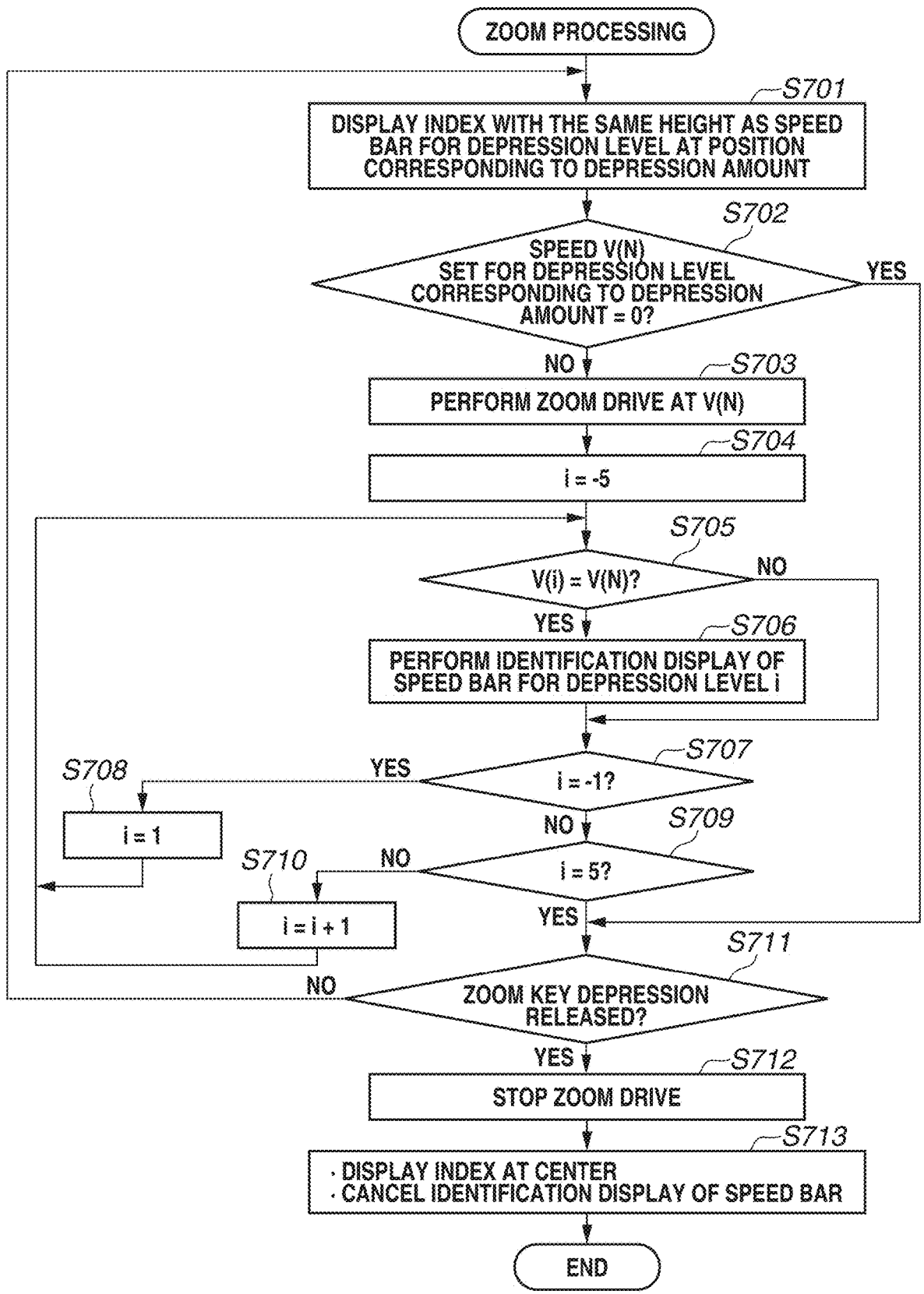
FIG. 7 is a flowchart illustrating zoom processing.

FIG. 7 is a flowchart illustrating the zoom processing performed in steps S305 and S327 illustrated in FIGS. 3A and 3B (described above) and in step S803 illustrated in FIG. 8 (described below). The zoom processing is performed in response to a user operation. More specifically, when the zoom key 104 is pressed, the system control unit 50 performs a zoom drive at the zooming speed corresponding to the depression amount and displays the depression amount currently detected and the corresponding depression level on the display unit 28. The displays illustrated in FIGS. 6A to 6E are implemented through the zoom processing. In the zoom processing performed in response to the depression of the zoom key 104 in step S305, a speed bar and index display (described below) is performed on a zooming speed bar simplified display (described below). In the zoom processing performed in response to the depression of the zoom key 104 in step S327 and in step S803 illustrated in FIG. 8 (described below), a speed bar and index display (described below) is performed on the above-described zooming speed bar detailed display in the display format described above with reference to FIGS. 6A to 6E. Display examples corresponding to steps of the flowchart illustrated in FIG. 7 (described below) are examples of applications of the zooming speed bar detailed display. Processing illustrated in FIG. 7 is performed even during movie recording and in the movie recording stopped state (recording standby state).

In step S701, the system control unit 50 displays an index (indicator) indicating the current depression amount (depression degree) with the same height as the speed bar corresponding to the depression amount at the horizontal position corresponding to the depression amount of the zoom key 104 currently detected. As a result, the index 420 is displayed as illustrated in FIGS. 6A to 6D.

In step S702, the system control unit 50 determines whether a setting speed V(N) assigned to the depression level N corresponding to the depression amount of the zoom key 104 currently detected is 0. When the setting speed V(N) is 0 (YES in step S702), the processing proceeds to step S711. In this case, the system control unit 50 performs neither a zoom drive nor a highlight display (identification display) of the speed bar even if the depression of the zoom key 104 is detected. On the other hand, when the setting speed V(N) is not 0 (NO in step S702), the processing proceeds to step S703.

In step S703, the system control unit 50 controls the zoom control unit 201 to perform a zoom drive at the zooming speed V(N). When the depression level N corresponding to the detected depression amount is positive, the zooming direction is the telephoto side (zoom-in). On the other hand, when the depression level N is negative, the zooming direction is the wide-angle side (zoom-out). In addition, even if an operation of the zoom key 104 toward the telephoto side is detected after the zoom position has reached the telephoto end, the system control unit 50 does not perform a zoom drive. If the telephoto end is reached during a zoom drive corresponding to an operation of the zoom key 104 toward the telephoto side, the system control unit 50 stops zooming. In addition, even if an operation of the zoom key 104 toward the wide-angle side is detected after the zoom position has reached the wide-angle end, the system control unit 50 does not perform a zoom drive. If the wide-angle end is reached during a zoom drive corresponding to an operation of the zoom key 104 toward the wide-angle side, the system control unit 50 stops zooming.

In step S704, the system control unit 50 initializes to −5 the variable i to be used as a counter for each depression level.

In step S705, the system control unit 50 determines whether the zooming speed V(i) assigned to the depression level i (i-th step of the operation amount) is the same as the zooming speed V(N) assigned to the depression level N (N-th step of the operation amount) currently detected. The system control unit 50 performs this determination also in consideration of the sign of the zooming speed. More specifically, when the two zooming speeds have the same absolute value and different zooming directions (wide-angle and telephoto sides), the system control unit 50 does not determine that the two zooming speeds are the same in step S705. When the zooming speeds V(i) and V(N) are the same (YES in step S705), the processing proceeds to step S706. On the other hand, when the zooming speeds V(i) and V(N) are different (NO in step S705), the processing proceeds to step S707.

In step S706, the system control unit 50 performs an identification display (highlight display) of the speed bar of the depression level i. The identification display refers to processing for displaying speed bars not subjected to an identification display, for example, in white, and displaying the speed bar subjected to an identification display in a different color, for example, in orange. The difference in the display format is not limited to color, and may be the line thickness (thick frame lines), shape, and arrow. The identification display is performed regardless of whether the depression level i is the same as or different from the depression level N currently detected. The identification display is performed like the speed bar 412 illustrated in FIG. 6A, the speed bar 425 illustrated in FIG. 6B, and the speed bars 412 and 413 illustrated in FIG. 6C.

In step S707, the system control unit 50 determines whether the variable i reaches −1. When the variable i reaches −1 (when confirmation is completed for all of the depression levels on the wide-angle side) (YES in step S707), the processing proceeds to step S708. In step S708, the system control unit 50 sets the variable i to 1 (to skip 0 and proceed to the confirmation of the depression levels on the telephoto side). Then, the processing returns to step S705. In step S709, the system control unit 50 determines whether the variable i reaches 5. When the variable i does not reach 5 (NO in step S709), the processing proceeds to step S710. In step S710, the system control unit 50 increments the variable i by 1. Then, the processing returns to step S705. On the other hand, when the variable i reaches 5 (when confirmation is completed also for all of the depression levels on the telephoto side following the wide-angle side) (YES in step S709), the processing proceeds to step S711.

In step S711, the system control unit 50 determines whether the depression of the zoom key 104 is canceled (the depression amount becomes 0). When the depression of the zoom key 104 is not canceled (NO in step S711), the processing proceeds to step S701. Then, the system control unit 50 repeats processing at predetermined intervals. This is because the depression amount of the zoom key 104 may vary while the depression of the zoom key 104 is continued. More specifically, a zoom drive and display by the processing in steps S701 to S710 dynamically change following the variation of the depression amount of the zoom key 104. On the other hand, when the depression of the zoom key 104 is canceled (YES in step S711), the processing proceeds to step S712.

In step S712, the system control unit 50 stops a zoom drive. If the zoom position has reached the telephoto or the wide-angle end and a zoom drive has been stopped, the system control unit 50 performs no operation.

In step S713, the system control unit 50 returns each display state to the non-depression state of the zoom key 104. More specifically, the system control unit 50 displays an index at the central position between the speed bars on the wide-angle and the telephoto sides to indicate a state where the zoom key 104 is not currently being pressed. The system control unit 50 also cancels the identification display of a speed bar performed in step S706. As a result, the display as illustrated in FIG. 6E is performed.

Figure 8:
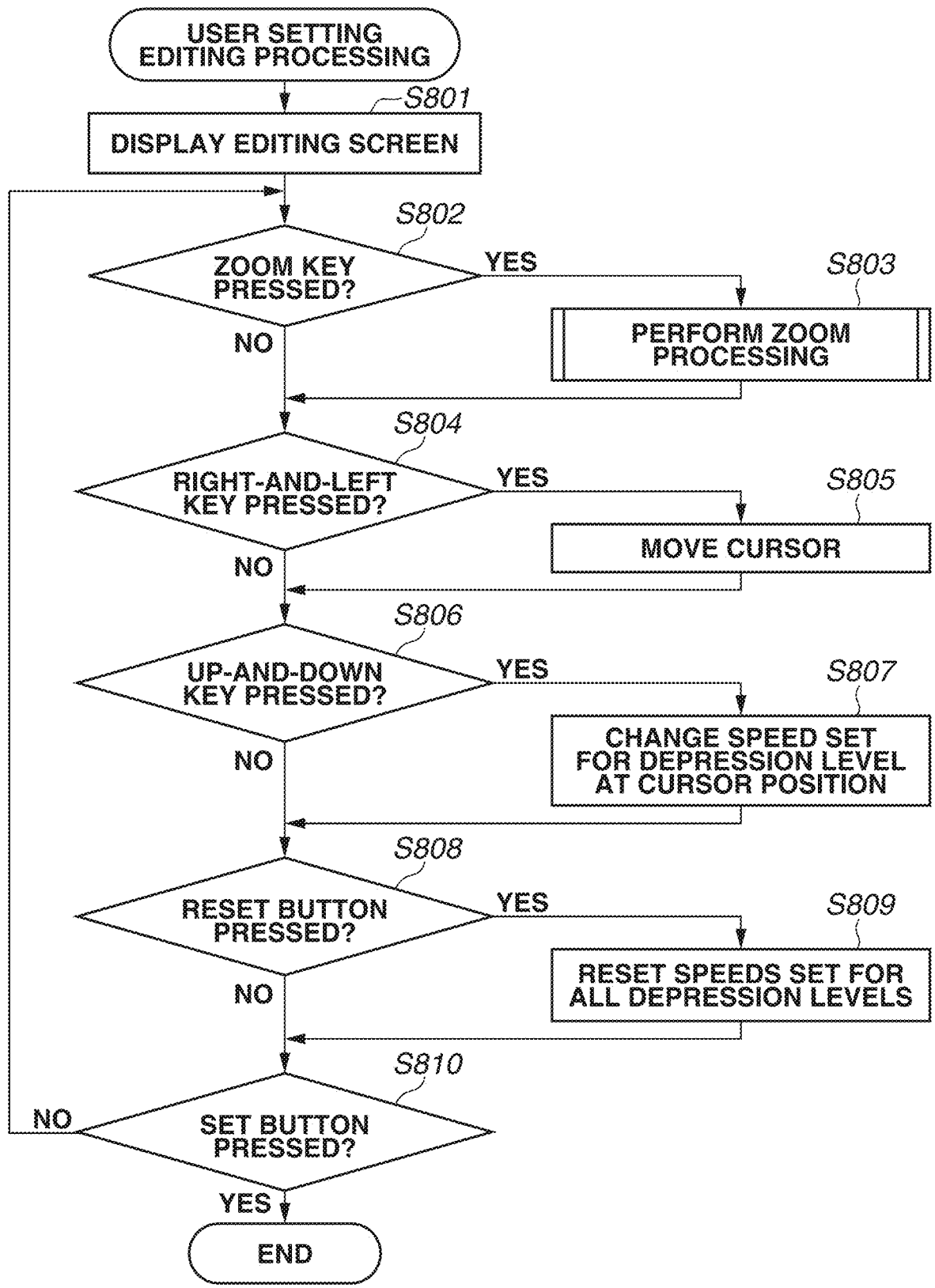
FIG. 8 is a flowchart illustrating user setting editing processing.

FIG. 8 is a flowchart illustrating in detail the user setting editing processing performed in step S325 illustrated in FIG. 3B. This processing customizes the zooming speeds to be assigned to the respective depression levels based on a user's operation. This processing is implemented when a program recorded in the nonvolatile memory 56 is loaded into the system memory 52 and then executed by the system control unit 50.

In step S801, the system control unit 50 displays an editing screen (user setting editing screen) on the display unit 28. The editing screen is displayed based on the assignment pattern of the zooming speeds for the respective depression levels illustrated in the user setting confirmation screen displayed immediately before the transition to the user setting editing processing. More specifically, if the screen illustrated in FIG. 4C-1 has been displayed as the user setting confirmation screen, the screen illustrated in FIG. 4C-2 is displayed as an editing screen. If the screen illustrated in FIG. 4D-1 has been displayed as the user setting confirmation screen, the screen illustrated in FIG. 4D-2 is displayed as an editing screen. If the screen illustrated in FIG. 4E-1 has been displayed as the user setting confirmation screen, the screen illustrated in FIG. 4E-2 is displayed as an editing screen. In each editing screen, the zooming speed bar display area 410 including the speed bars corresponding to the wide-angle side and the speed bars corresponding to the telephoto side is displayed. Dotted-line frames indicating the zooming speed bar display area 410 are drawn for convenience' sake, and are not actually displayed. The numerical areas of the zooming speeds corresponding to the respective depression levels are displayed only on the telephoto side (only the numerical areas corresponding to the depression levels 1 to 5 are displayed). The numerical areas of the zooming speeds are not displayed on the wide-angle side for the following reason. According to the present exemplary embodiment, when settings are made on the telephoto side, settings are also made on the wide-angle side in symmetric relation with the telephoto side. More specifically, zooming speeds having the same absolute value (and the opposite sign or zooming direction) are automatically set to depression levels having the opposite sign and the same absolute value. Numerical areas 451 to 455 correspond to the depression levels 1 to 5, respectively. A RESET button 450 is a display item for accepting an instruction for clearing the user's customization and returning the zooming speeds (to be assigned to all of the depression levels) to the preset pattern corresponding to the user setting number out of the above-described preset patterns 1 to 3. A SET icon 456 is a display item for accepting an instruction for applying and ending the user setting editing processing. For display items assigned the same reference numerals as display items described in other display examples, redundant descriptions will be omitted.

Any one of the RESET button 450, the numerical areas 451 to 455, and the SET icon 456 can be selected by moving the cursor by operating the right-and-left key. FIGS. 4C-2, 4D-2, and 4E-2 illustrate states where the numerical area 451 is selected. By pressing the up-and-down key included in the operation unit 70 in a state where any one of the numerical areas 451 to 455 is selected, the zooming speed to be assigned to the corresponding depression level can be changed (increased or decreased).

In step S802, the system control unit 50 determines whether the zoom key 104 is pressed. When the system control unit 50 determines that the zoom key 104 is pressed (YES in step S802), the processing proceeds to step S803. In step S803, the system control unit 50 performs the above-described zoom processing illustrated in FIG. 7. More specifically, when the zoom key 104 is pressed even in the editing screen, the system control unit 50 performs a zooming drive according to the depression amount, displays the index of the detected depression amount, and performs an identification display of the speed bar of the depression level assigned the corresponding zooming speed, as illustrated in FIGS. 6A to 6E and 7. Even before the editing processing is applied, this processing is performed with the zooming speeds of numerical values displayed in the numerical areas 451 to 455, at the time. This enables the user to customize the zooming speeds while confirming the zoom processing to be performed during editing for customization.

In step S804, the system control unit 50 determines whether the right-and-left key included in the operation unit 70 is pressed (more specifically, whether a cursor movement instruction or a selection item change instruction is issued). When the right-and-left key is pressed (YES in step S804), the processing proceeds to step S805. On the other hand, when the right-and-left key is not pressed (NO in step S804), the processing proceeds to step S806. In step S805, the system control unit 50 moves the cursor in response to the right-and-left key operation to enable any one of the RESET button 450, the numerical areas 451 to 455, and the SET icons 456.

In step S806, the system control unit 50 determines whether the up-and-down key included in the operation unit 70 is pressed (more specifically, whether an assignment speed change instruction is issued). When the up-and-down key is pressed (YES in step S806), the processing proceeds to step S807. On the other hand, when the up-and-down key is not pressed (NO in step S806), the processing proceeds to step S808.

In step S807, the system control unit 50 increases or decreases the numerical value in the numerical area currently being selected (at the current cursor position) in response to an up-and-down key operation. According to the present exemplary embodiment, the numerical value can set to a number from 0 to 16. This operation changes the zooming speed to be assigned to the depression level corresponding to the numerical area currently being selected. If the numerical area is not selected (when the RESET button 450 or the SET icon 456 is selected), this processing is not performed.

The system control unit 50 performs control so that the zooming speed to be assigned to each depression level on the telephoto side becomes equal to or larger than the value of the one-lower depression level and equal to or less than the one-upper depression level. For example, the system control unit 50 performs control such that the zooming speed to be assigned to the depression level 4 does not become lower than the zooming speed currently assigned to the depression level 3. More specifically, assume that an operation for decreasing the zooming speed to be assigned to the depression level 4 from 9 to 8 is performed in a state where the zooming speed 7 is currently assigned to the depression level 3. In response to this operation, the system control unit 50 changes the zooming speed assigned to the depression level 4 to 8 without changing the zooming speed assigned to the depression level 3. In response to an operation for changing the zooming speed of the depression level 4 from 7 to 6 (lower than the zooming speed currently assigned to the depression level 3), the system control unit 50 changes the zooming speed to be assigned to the depression level 4 to 6. The system control unit 50 also changes the zooming speed currently assigned to the depression level 3 to 6 which equals the zooming speed currently assigned to the depression level 4.

The timing for changing the zooming speed of the depression level 3 according to the depression level 4 may be associated with an operation for increasing and decreasing the zooming speed of the depression level 4. However, it is more preferable to change the zooming speed of the depression level 3 at the timing when the zooming speed of the depression level 4 is assumed to have been applied. For example, the following processing may be performed at the timing when the cursor moves from the depression level 4 to another position in response to a right-and-left key operation. When the zooming speed assigned to the depression level 4 is lower than the zooming speed assigned to the depression level 3, the system control unit 50 changes the zooming speed of the depression level 3 to a zooming speed that is the same as the zooming speed assigned to the depression level 4. At the same time, when the changed zooming speed of the depression level 3 is lower than the zooming speed of the depression level 2, the system control unit 50 changes the zooming speed assigned to the depression level 2 to a zooming speed that is the same as the zooming speed of the depression levels 3 and 4. Likewise, the system control unit 50 adjusts the zooming speed of the depression level 1 as required so as not to exceed the zooming speed of the depression level 2. On the contrary, if the zooming speed of the depression level 4 exceeds the zooming speed assigned to the depression level 5, the system control unit 50 changes the zooming speed assigned to the depression level 5 to a zooming speed that is the same as the zooming speed assigned to the depression level 4.

Instead of performing the above-described processing, the system control unit 50 may limit the adjustment operation during adjustment for zooming speed assignment such that the zooming speed to be assigned neither underruns the zooming speed of the one-lower depression level nor exceeds the zooming speed of the one-upper depression level. For example, when an operation (down key depression) for decreasing the zooming speed to be assigned to the depression level 4 is performed in a state where the zooming speed 7 is currently assigned to the depression level 3, the system control unit 50 limits the adjustment operation such that the zooming speed of the depression level 4 cannot be changed to less than 7.

Limiting the adjustment operation in this way establishes a relation that the zooming speed assigned to a higher depression level is equal to or higher than the zooming speed assigned to a lower depression level. More specifically, the above-described limitation prevents the zooming speed from decreasing when the user increases the depression force on the zoom key 104.

In step S808, the system control unit 50 determines whether the SET button included in the operation unit 70 is pressed (more specifically, whether a reset instruction is issued) in a state where the RESET button 450 is selected. When the reset instruction is issued (YES in step S808), the processing proceeds to step S809. On the other hand, when the reset instruction is not issued (NO in step S808), the processing proceeds to step S810.

In step S809, the system control unit 50 clears all of the zooming speeds for the respective depression levels customized by the user and resets them to the preset pattern corresponding to the user setting number currently being edited. The above-described preset patterns are stored in the nonvolatile memory 56. More specifically, the system control unit 50 sets the preset pattern 1 during editing of the user setting number 1, sets the preset pattern 2 during editing of the user setting number 2, and sets the preset pattern 3 during editing of the user setting number 3.

In step S810, the system control unit 50 determines whether the SET button included in the operation unit 70 is pressed (more specifically, whether an application instruction is issued) in a state where the SET icon 456 is selected. When the application instruction is issued (YES in step S810), the processing exits the flowchart. On the other hand, when the application instruction is not issued (NO in step S810), the processing returns to step S802.

Figure 9:
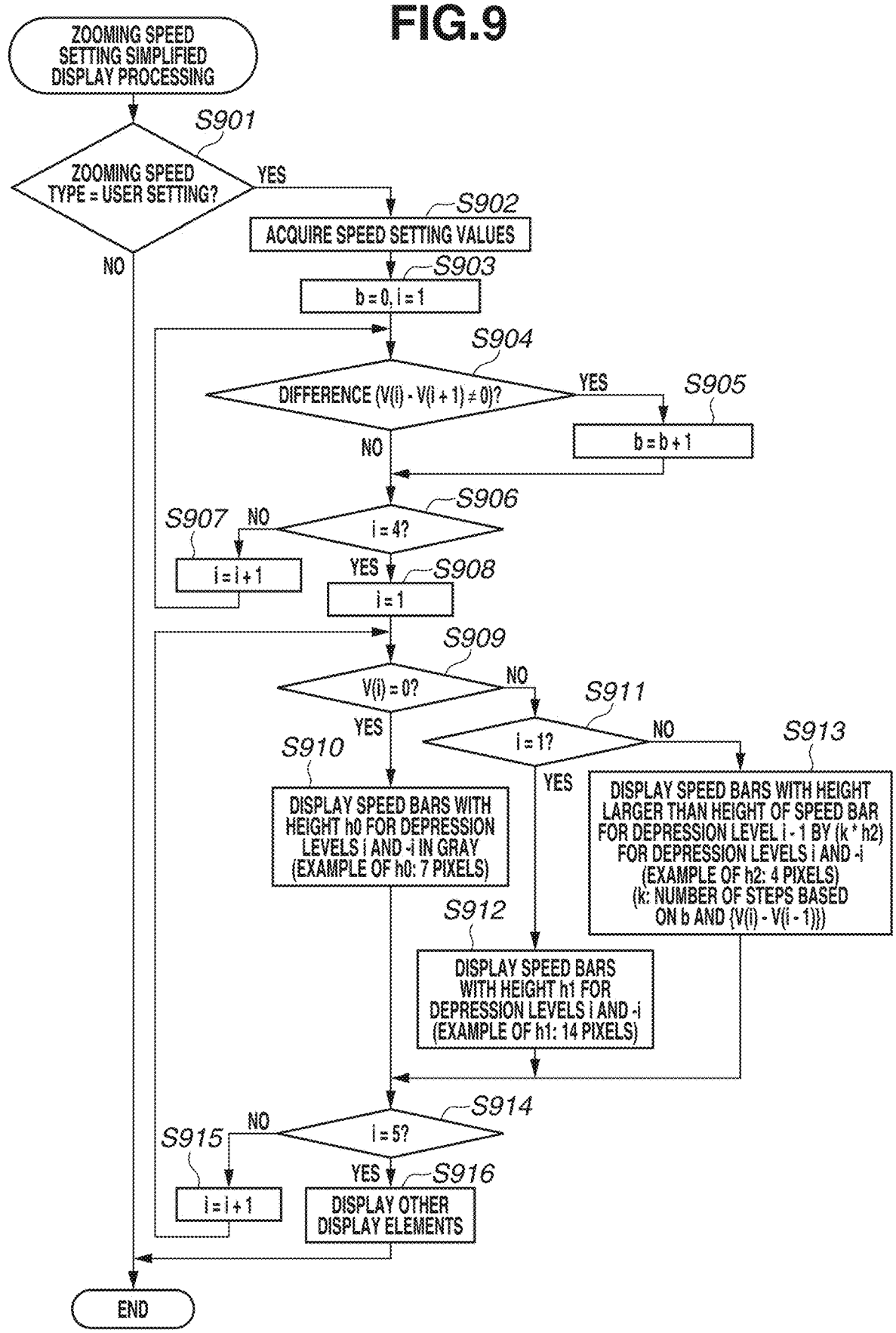
FIG. 9 is a flowchart illustrating zooming speed setting simplified display processing.

FIG. 9 is a detailed flowchart illustrating the above-described zooming speed setting simplified display processing in step S302 illustrated in FIG. 3A. This processing is implemented when a program recorded in the nonvolatile memory 56 is loaded into the system memory 52 and then executed by the system control unit 50. In the recording standby screen, the user captures a movie while confirming a subject. Therefore, if speed bars having a large area are superimposed on the LV image as in the user setting confirmation screen and the user setting editing screen, the speed bars will disturb the visibility of the subject. Therefore, in the zooming speed setting simplified display processing, at least under the same setting situation, the system control unit 50 displays speed bars with a display area smaller than that in the zooming speed setting detailed display processing described above with reference to FIG. 5. The total area of all speed bars is also smaller than that in the zooming speed setting detailed display processing. However, simply reducing the size of the above-described speed bar group in the user setting confirmation screen and the user setting editing screen reduces the size of the speed bars, resulting in degraded visibility. More specifically, the difference in height between speed bars decreases to increase the difficulty in distinguishing the speed difference based on the height of the speed bars. According to the present exemplary embodiment, therefore, the system control unit 50 performs a simplified display which makes it easier to identify the relative speed difference between speed bars based on the number of depression levels assigned a zooming speed different from the zooming speed assigned to the one-side adjacent depression level.

In step S901, the system control unit 50 determines whether the zooming speed type is the user setting ("USER"). When the zooming speed type is the user setting (YES in step S901), the processing proceeds to step S902. On the other hand, when the zooming speed type is not the user setting (NO in step S901), the processing exits the flowchart. More specifically, according to the present exemplary embodiment, when the zooming speed type is not the user setting, the system control unit 50 does not basically perform a simplified display of the zooming speed settings. However, the system control unit 50 may perform a simplified display regardless of the zooming speed type.

In step S902, the system control unit 50 reads the setting values of zooming speeds (setting patterns of the zooming speeds assigned to the respective depression levels) for the respective depression amounts (depression levels) of the zoom key 104 registered to the currently set user setting number from the nonvolatile memory 56.

In step S903, the system control unit 50 initializes to 0 a variable b to be used as a counter for counting the number of depression levels assigned a zooming speed different from the zooming speed assigned to the one-side adjacent depression level. The system control unit 50 also initializes to 1 the variable i to be used as a counter for each depression level.

In step S904, the system control unit 50 determines whether there is a difference between the speed V(i) currently assigned to the depression level i and the speed V(i+1) currently assigned to the adjacent depression level (i+1). More specifically, the system control unit 50 determines whether the speed V(i) minus the speed V(i+1) is 0. When the speed V(i) minus the speed V(i+1) is not 0, i.e., when there is a difference between V(i) and V(i+1) (YES in step S904), the processing proceeds to step S905. In step S905, the system control unit 50 increments the variable b by 1. Then, the processing proceeds to step S906. In this case, the zooming speed setting of the depression level i is different from that of the upper adjacent depression level. When the speed V(i) minus the speed V(i+1) is 0, i.e., when there is no difference between V(i) and V(i+1) (NO in step S904), the system control unit 50 does not increment the variable b. Then, the processing proceeds to step S906. In this case, the zooming speed setting of the depression level i is the same as that of the upper adjacent depression level.

In step S906, the system control unit 50 determines whether the setting of the variable i reaches 4 which is smaller than the maximum value of the depression level by 1 (4 is the maximum value of the depression level having the upper adjacent depression level). When the variable i does not reach 4 (NO in step S906), the processing proceeds to step S907. In step S907, the system control unit 50 increments the variable i by 1. Then, the processing returns to S904. Repeating the processing in steps S904 to S907 determines the value of the variable b, i.e., the number of different setting values out of the zooming speed setting values assigned to the respective depression levels (the number of depression levels assigned a zooming speed different from the zooming speed assigned to the one-side adjacent depression level). On the other hand, when the variable i reaches 4 (YES in step S906), the determination of whether there is a difference in zooming speed setting from an adjacent depression level is completed for all of depression levels. Then, the processing proceeds to step S908.

In step S908, the system control unit 50 initializes to 1 the variable i to be used as a counter for each depression level.

In step S909, the system control unit 50 determines whether the speed V(i) currently assigned to the depression level i is 0. When the speed V(i) is 0 (YES in step S909), the processing proceeds to step S910. On the other hand, when the speed V(i) is not 0 (NO in step S909), the processing proceeds to step S911.

In step S910, the system control unit 50 displays a gray bar-like rectangle with a height h0 (for example, 7 pixels) as speed bars for the depression levels i and −i. The numerical value h0 is equal to or less than H0 described above in step S505. Thus, also in a simplified display, by displaying speed bars corresponding to depression levels assigned the speed 0 with a height h0 instead of a zero height, positions corresponding to depression levels assigned the speed 0 can be displayed without using a blank. In addition, displaying such speed bars in gray enables the user to recognize the disabled state, i.e., the fact that zooming is not performed with this depression level (the zooming speed 0 is assigned to the depression level).

In step S911, the system control unit 50 determines whether the variable i is 1. When the variable i is 1, i.e., when the depression level 1 is subjected to the current processing (YES in step S911), the processing proceeds to step S912. On the other hand, when the variable i is not 1 (NO in step S911), the processing proceeds to step S913.

In step S912, the system control unit 50 displays white bar-like rectangles (in the normal display format) with a height h1 (>h0, for example, 14 pixels) as speed bars for the depression levels i and −i (speed bars for the depression levels 1 and −1). The numerical value h1 is larger than h0 described above in step S910 and smaller than H2 described above. As described above, the zooming speed assigned to a higher depression level is equal to or higher than the zooming speed assigned to a lower depression level. More specifically, the depression level 1 as the lowest depression level is assigned the minimum zooming speed out of the other depression levels. In addition, the speed V(i) is not 0 (NO in step S909), and the assigned zooming speed is larger than 0. In the zooming speed setting simplified display processing, when the zooming speed assigned to the depression level 1 is larger than 0, the system control unit 50 displays the speed bar of the depression level 1 with a fixed height h1 regardless of the magnitude of the value. The system control unit 50 displays speed bars for depression levels larger than the depression level 1 such that relative size relations with the speed bar of the depression level 1 are recognized. Adjusting the display in this way makes it possible to restrain the display area (height) of speed bars even if totally high zooming speeds are assigned to depression levels, thus reducing the degree of disturbing the visibility of the background LV image.

In step S913, the system control unit 50 displays a bar-like rectangle with a height larger than that of the speed bar of the depression level (i−1) (the speed bar of the one lower depression level) by (k*h2) as speed bars for the depression levels i and −i (the speed bar of the depression level 2 or higher and the speed bar of the depression level −2 or lower). In this case, h2 is a predetermined value, for example, 4 pixels. In this case, the above-described height values satisfy a relation h2<h1<H2. k denotes the number of steps based on the variable b counted in the above-described processing in steps S904 to S907 and {V(i)−V(i−1)} as the difference between the zooming speed assigned to the depression level subjected to the current processing and the zooming speed assigned to the one lower depression level. FIG. 11 is a table illustrating the correspondence between the variable b and the number of steps determined by {V(i)−V(i−1)}. The relation illustrated in FIG. 11 is pre-recorded in the nonvolatile memory 56. The system control unit 50 acquires the number of steps k based on the variable b, {V(i)−V(i−1)}, and information indicating the relation as illustrated in FIG. 11 recorded in the nonvolatile memory 56. For example, when the zooming speeds assigned to the depression levels 1 to 5 are all different, b=4. In step S913, when i=3, the zooming speed assigned to the depression level 3 is 9, and the zooming speed assigned to the depression level 2 is 6, then {V(i)−V(i−1)}={9-6}=3. Therefore, k=1 is obtained based on the table illustrated in FIG. 11. In this case, the system control unit 50 determines that the height of the speed bar of the depression level 3 is larger than the height of the speed bar of the depression level 2 by (k*h2)=h2 and displays the speed bar of the depression level 3. For example, in a case (a case illustrated in FIG. 10B-2) where the depression levels 1 to 5 are assigned zooming speeds "1, 2, 2, 2, 16", respectively, when i=2, the variable b=2 and {V(i)−V(i−1)}=1. Therefore, k=1 is obtained based on the table illustrated in FIG. 11. In this case, the system control unit 50 determines that the height of the speed bar of the depression level 2 is larger than the height of the speed bar of the depression level 1 by (k*h2)=h2 pixels. Since V(1)=1, the height of the speed bar of the depression level 1 is h1=14 pixels. More specifically, the height of the speed bar of the depression level 2 is h1+h2=14+4=18 pixels. In the processing for i=3 under the same assignment situation, the variable b=2 and {V(i)−V(i−1)}=0. Therefore, k=0 is obtained based on the table illustrated in FIG. 11. In this case, the system control unit 50 determines that the height of the speed bar of the depression level 3 is larger than the height of the speed bar of the depression level 2 by (k*h2)=0 pixels. More specifically, the height of the speed bar of the depression level 3 is the same as the height of the speed bar of the depression level 2, i.e., 18 pixels. In addition, in the processing for i=5 under the same assignment situation, the variable b=2 and {V(i)−V(i−1)}=14. Therefore, k=3 is obtained based on the table illustrated in FIG. 11. In this case, the system control unit 50 determines that the height of the speed bar of the depression level 5 is larger than the height of the speed bar of the depression level 4 by (k*h2)=12 pixels. Since V(4)=V(2), the height of the speed bar of the depression level 4 is 18 pixels, which equals the height of the speed bar of the depression level 2. More specifically, the height of the speed bar of the depression level 5 is 18+12=30 pixels. In a simplified display, the height of the speed bars of the respective depression levels do not uniquely correspond to the zooming speeds assigned to respective speed bars. Therefore, the user cannot recognize exact speeds assigned based only on the height of the speed bars. However, by viewing the speed bars displayed in this way, the user can recognize that the difference (=14) between the zooming speeds of the depression levels 4 and 5 is remarkably larger than the difference (=1) between the zooming speeds of the depression levels 1 and 2.

In step S914, the system control unit 50 determines whether the variable i reaches 5. When the variable i does not reach 5 (NO in step S914), the processing proceeds to step S915. In step S915, the system control unit 50 increments the variable i by 1 to prepare for processing for displaying the speed bar of the following depression level. Then, the processing returns to step S909. On the other hand, when the variable i reaches 5 (YES in step S914), the display processing is completed for all of the speed bars. Then, the processing proceeds to step S916.

In step S916, the system control unit 50 displays other display elements (for example, icons 476 and 486 described below) to be displayed in the zooming speed setting simplified display processing, and ends processing. In the zooming speed setting simplified display processing according to the present exemplary embodiment, the zooming speed numerical value display area 430 is not to be displayed (numerical values of the zooming speeds assigned to the respective depression levels are not to be displayed). However, the zooming speed numerical value display area 430 may be displayed.

Figures 1, 10A:
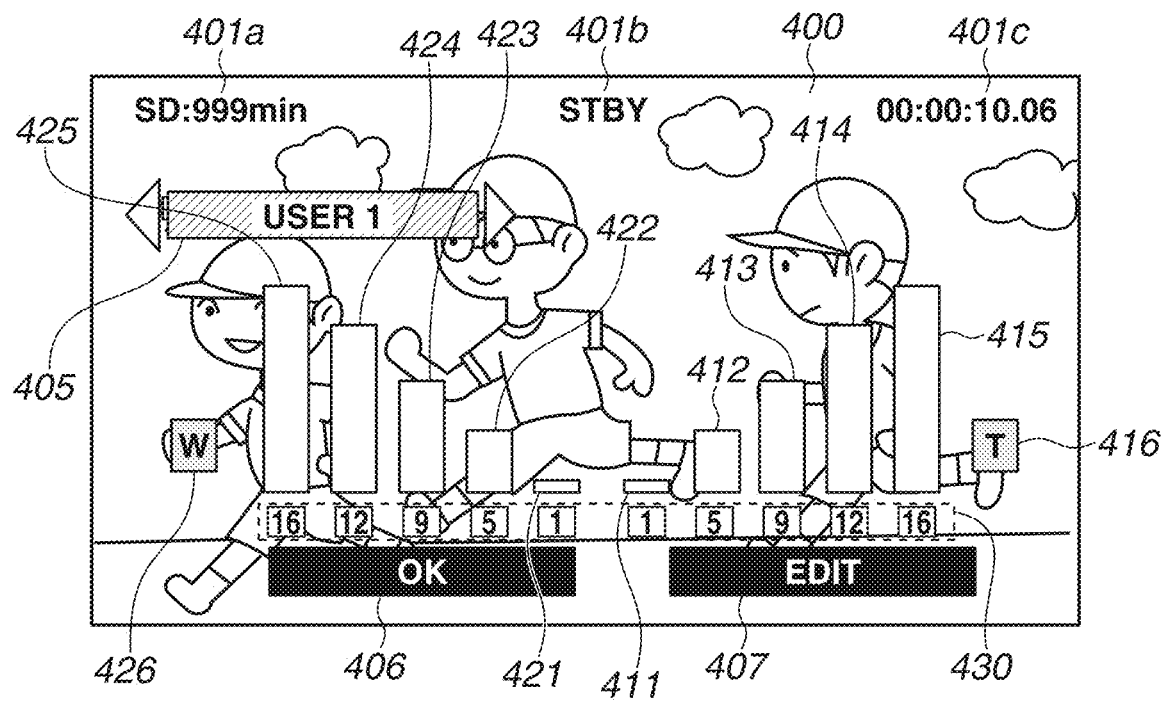
Figures 2, 10A:
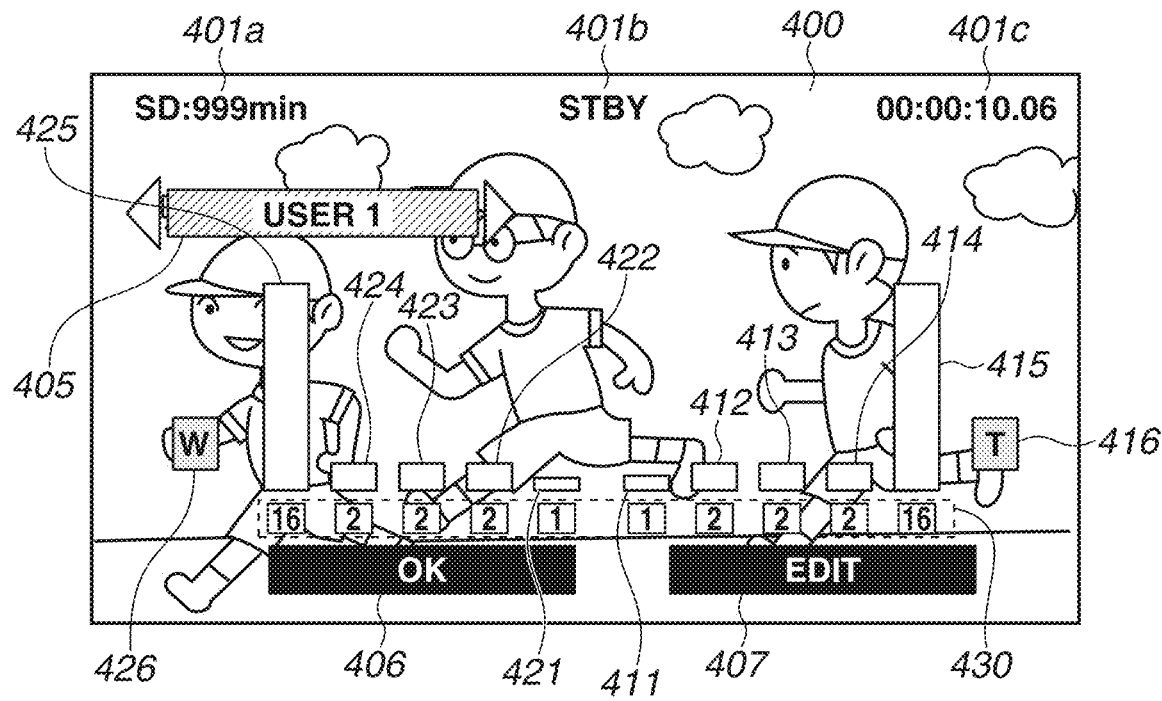
Figures 3, 10A:
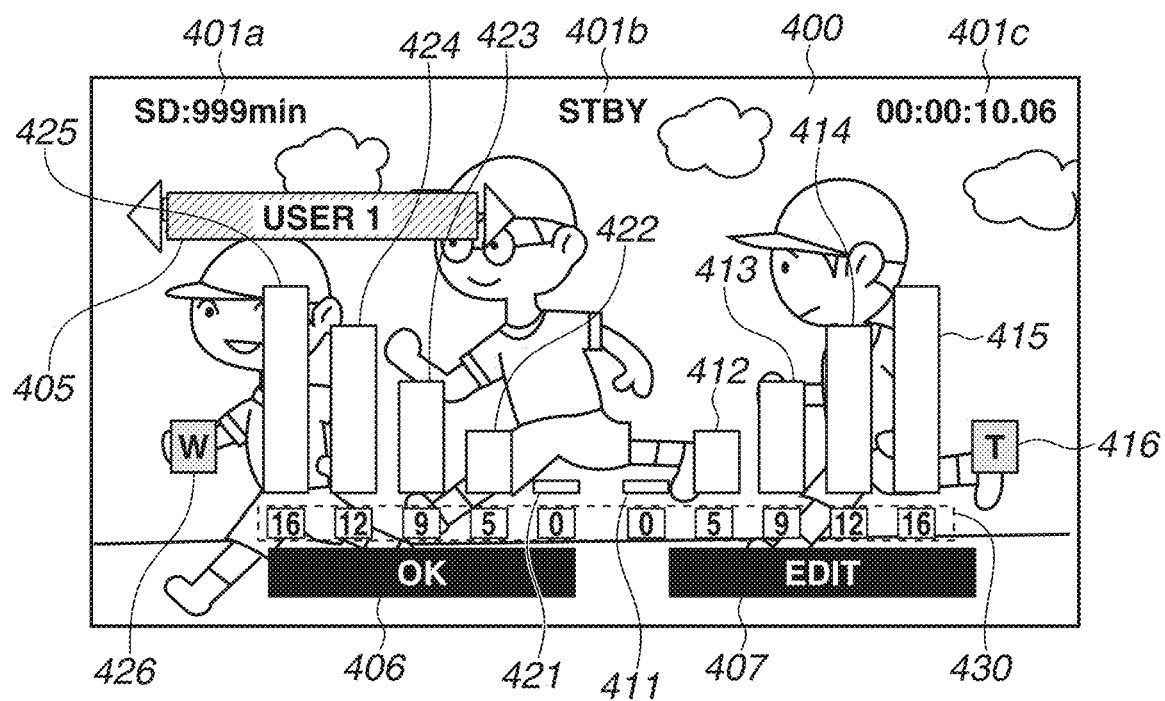
Figures 1, 10B:
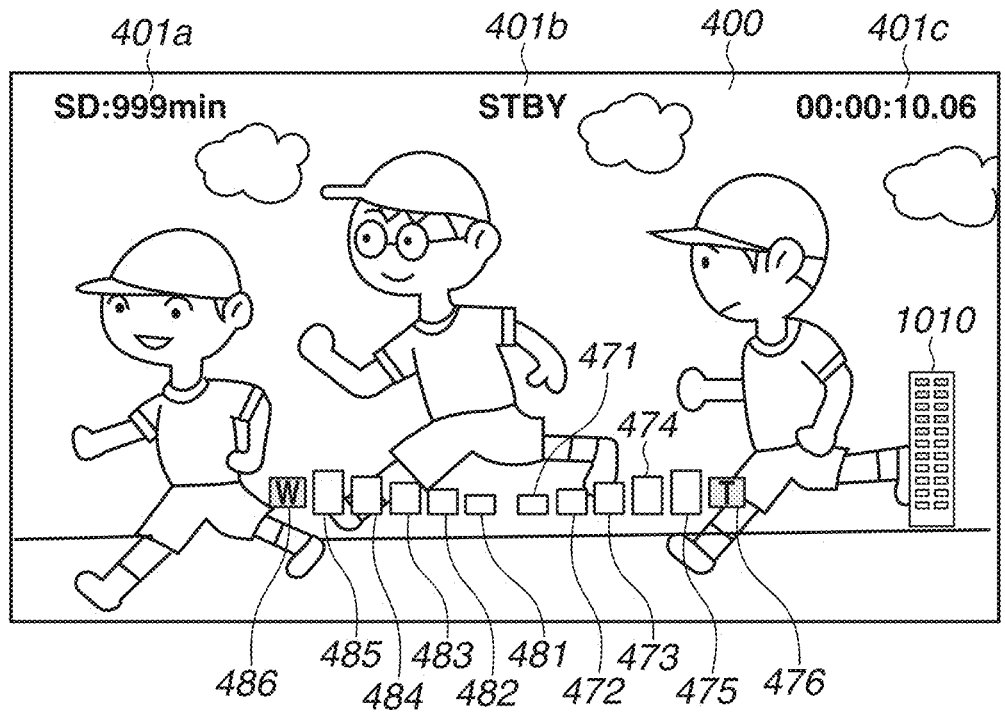
Figures 2, 10B:
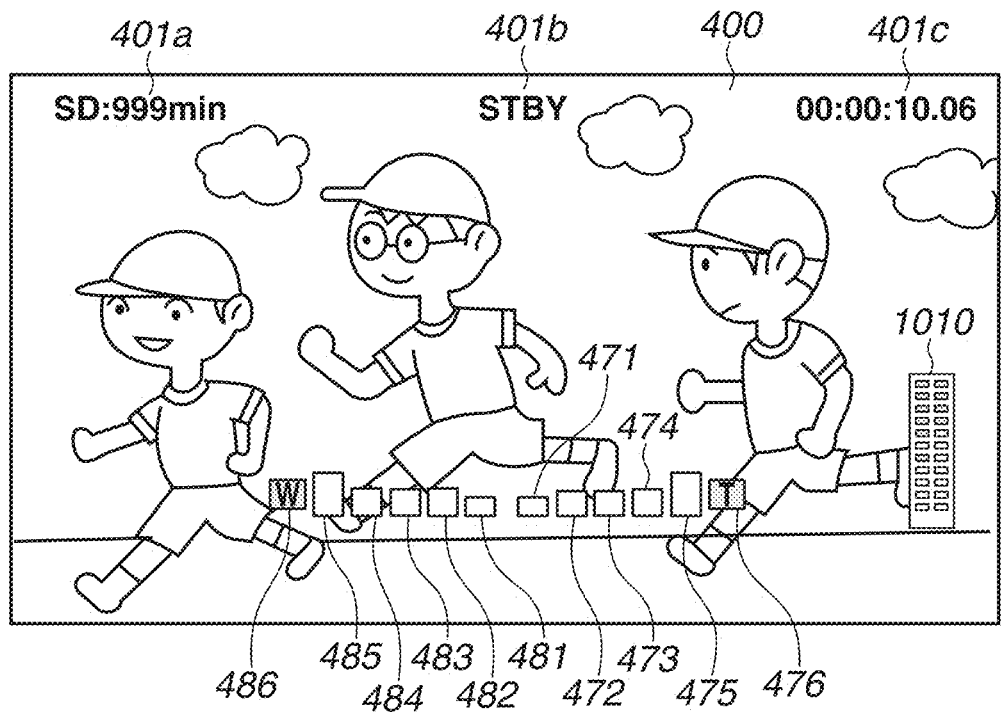
Figures 3, 10B:
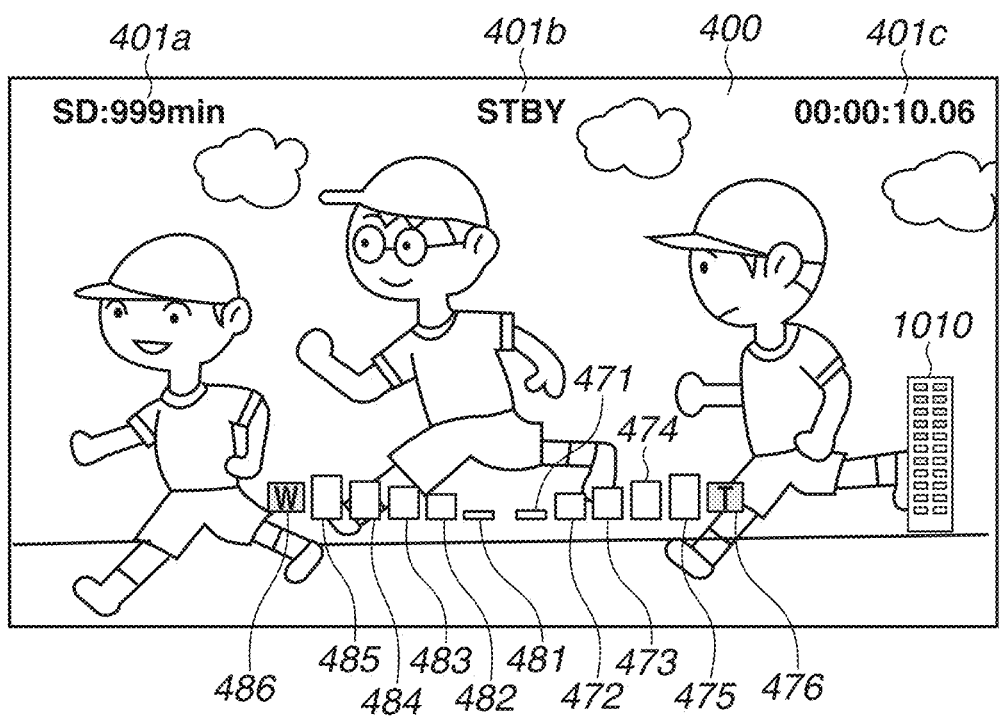

Examples of three different assignment patterns displayed in the zooming speed setting detailed display processing (illustrated in FIG. 5) and the zooming speed setting simplified display processing (illustrated in FIG. 9) will be described below with reference to FIGS. 10A-1 to 10A-3 and 10B-1 to 10B-3. FIGS. 10A-1 to 10A-3 illustrate examples displayed in the zooming speed setting detailed display processing (illustrated in FIG. 5). FIGS. 10B-1 to 10B-3 illustrate examples displayed in the zooming speed setting simplified display processing (illustrated in FIG. 9). FIGS. 10A-1 and 10B-1 illustrate display examples of the same setting pattern (the depression levels 1 to 5 are assigned zooming speeds "1, 5, 9, 12, 16", respectively). FIGS. 10A-2 and 10B-2 illustrate display examples of the same setting pattern (the depression levels 1 to 5 are assigned zooming speeds "1, 2, 2, 2, 16", respectively). FIGS. 10A-3 and 10B-3 illustrate display examples of the same setting pattern (the depression levels 1 to 5 are assigned zooming speeds "0, 5, 9, 12, 16", respectively). Display elements equivalent to the ones described above with reference to FIGS. 4A to 4E-2 are assigned the same reference numerals. Referring to FIGS. 10B-1 to 10B-3, speed bars 471 to 475 correspond to the depression levels 1 to 5 on the telephoto side, respectively. The icon 476 is a guide display which indicates that the speed bars 471 to 475 on the right-hand side correspond to an operation toward the telephoto side. Speed bars 481 to 485 correspond to the depression levels −1 to −5 on the wide-angle side, respectively. The icon 486 is a guide display which indicates that the speed bars 481 to 485 on the left-hand side correspond to an operation toward the wide-angle side. A display item 1010 is an audio level meter which indicates the recording level of sound to be recorded in a movie. The display item 1010 is not displayed in the user setting confirmation screen and the user setting editing screen where the zooming speed setting detailed display processing is performed. Like the display item 1010, the recording standby screen needs to display display elements related to image capturing in addition to display elements related to zooming speeds. Display spaces for these display elements need to be allocated. The recording standby screen has less display spaces usable for speed bar display as zooming speed information than the user setting confirmation screen and the user setting editing screen where the zooming speed setting detailed display processing is performed. In this meaning, the recording standby screen needs to display zooming speed settings in the simplified display format.

In the zooming speed setting detailed display processing, as illustrated in FIGS. 10A-1 to 10A-3, each speed bar is displayed in 17 steps (in L steps where L is larger than n) of height uniquely corresponding to the zooming speeds 0 to 16 assignable to five different depression levels (M depression levels, M steps). On the other hand, in the zooming speed setting simplified display processing, as illustrated in FIGS. 10B-1 to 10B-3, each speed bar is displayed in five steps (in n steps where n is smaller than L) of height not uniquely corresponding to the zooming speeds 0 to 16 assignable to five different depression levels (M depression levels). This display format is intended to restrict the maximum height of speed bars lower than that in the detailed display and display zooming speeds such that the difference in height between steps can be reliably recognized. If the difference in height between steps is too small (for example, 1 pixel), the user is unable to recognize the difference in height between speed bars. In this case, the user may incorrectly recognize that there is no difference between zooming speeds assigned to different depression levels although the zooming speeds are actually different. To prevent such false recognition, the difference in height between steps is secured to some extent (according to the present exemplary embodiment, 4 pixels are secured as h2 as described above). Therefore, instead of simply reducing speed bars in the detailed display, the height of the speed bar for the maximum value is shortened and the number of steps is reduced from 17 (L) to 5 (n).

Although the number of steps is reduced, the zooming speed representation is performed not simply by rounding numerical values, such as the first step assigned the zooming speed setting values 0 to 3, the second step assigned the zooming speed setting values 4 to 6, the third step assigned the zooming speed setting values 7 to 9, the fourth step assigned the zooming speed setting values 10 to 12, and the fifth step assigned the zooming speed setting values 13 to 16. In a case of zooming speed representation performed simply by rounding numerical values as described above, if the depression level 1 is assigned the zooming speed 1 and the depression level 2 is assigned the zooming speed 2, the corresponding speed bars become the same in height, disabling the user to recognize the speed difference between the depression levels 1 and 2. To prevent such a situation, as illustrated in FIG. 9, the height of each speed bar is determined based on the number of depression levels assigned a zooming speed different from the zooming speed assigned to the one-side adjacent depression level (the above-described variable b). More specifically, the height of each speed bar is not determined only by the corresponding zooming speed but determined in consideration of the zooming speeds corresponding to the other speed bars. In more detail, the height of each speed bar is determined based on the variable b which is determined based on the number of depression levels with which {V(i)−V(i+1)} is not 0 as described above with reference to FIG. 9. More specifically, the variable b is a numerical value in consideration of {V(i)−V(i+1)} for i=1 to 5. In other words, the height (number of steps) of each speed bar differs according to the zoom speeds of a plurality of depression levels other than the zooming speed for the speed bar out of the plurality of depression levels. For example, when the depression levels 1 to 5 are assigned zooming speeds "1, 5, 9, 12, 16", respectively (FIG. 10B-1), the height of the speed bar of the depression level 3 is 22 pixels. On the other hand, when the depression levels 1 to 5 are assigned zooming speeds "1, 2, 9, 9, 9", respectively, the variable b=2. In this case, even if the depression level 3 is assigned the same zooming speed 9, the height of the speed bar of the depression level 3 is 26 pixels. In addition, when the depression levels 1 to 5 are assigned zooming speeds "1, 1, 9, 9, 9", respectively, the variable b=1. In this case, even if the depression level 3 is assigned the same zooming speed 9, the height of the speed bar of the depression level 3 is 26 pixels. The above-described method is not a method for determining the reduction width based only on the maximum and minimum values out of the plurality of speed bars but a method for determining the reduction width in consideration of values other than the maximum and minimum values. This method enables the user to recognize the difference in height between the speed bars 471 and 472 and recognize that the zooming speeds assigned to the respective depression levels are different, as in the example illustrated in FIG. 10B-2. The zooming speed setting simplified display processing according to the present exemplary embodiment enables the user to more exactly recognize the difference between zooming speeds assigned to the respective depression levels with the number of steps (5) smaller than the number of steps (17) of settable zooming speed setting values.

When the user performs an instruction operation for changing from the simplified speed bar display (FIGS. 10B-1 to 10B-3) to the detailed speed bar display, the system control unit 50 may select the detailed speed bar display in 17 steps (FIGS. 10A-1 to 10A-3).

In the above-described example, as a factor for determining the height for the simplified speed bar display, the system control unit 50 uses the number of depression levels assigned a zooming speed different from the zooming speed assigned to the one-side adjacent depression level in ascending or descending order (the above-described variable b), the present invention is not limited thereto. For example, a similar effect to the above-described one can be acquired by determining the height of each speed bar based on the number of groups out of the depression levels 1 to 5 assigned the same zooming speed (variable c). For example, referring to the setting patterns illustrated in FIGS. 10A-1 and 10B-1 (the depression levels 1 to 5 are assigned zooming speeds "1, 5, 9, 12, 16", respectively), the number of groups assigned the same zooming speed is 5 (c=5). Referring to the setting patterns illustrated in FIGS. 10A-2 and 10B-2 (the depression levels 1 to 5 are assigned zooming speeds "1, 2, 2, 2, 16", respectively), the number of groups assigned the same zooming speed is 3 (c=3) (i.e., three groups includes a 1's group, a 2's group, and a 16's group). For five different depression levels, the variable c can take a value from 1 to 5. Even if the values 0 to 4 of the variable b illustrated in FIG. 11 are replaced with the value 1 to 5 of the variable c, respectively, the same display result is obtained.

A technique for displaying a plurality of values (values of the depression levels 1 to 5 in the above-described example) in a large number of steps (zooming speed in 17 steps) as values in a small number of steps (in 5 steps) in a simplified way, as illustrated in FIGS. 9 and 10B-1 to 10B-3, is applicable regardless of the zooming speed. For example, the technique is applicable to displaying the remaining capacities of a plurality of recording media including a main body memory, a memory card A, and a memory card B; displaying the remaining battery level of a plurality of batteries; displaying the output sound volume of a plurality of sound output devices; and displaying the output sound volume of a plurality of channels. Although, in the above-described examples, steps are represented by the height of each distance bar, the present invention is not limited thereto. Steps may be represented in terms of at least any one of a numeral value, a character string, a display area, a height, a width, brightness, and color.

According to the above-described present exemplary embodiment, a zooming operation can be performed with higher operability by using an operation member operable with a plurality of steps of operation amount (depression level).

The processing related to operations on the zoom key 104 according to the above-described exemplary embodiment is applicable not only to operations on the zoom key 104 but also to operations on operation members operable with a plurality of steps of operation amount. For example, the processing is also applicable to a push button capable of detecting a plurality of steps of depression amount, a pressure-sensitive operation device (such as a pressure-sensitive touch panel), a rotary operation member capable of detecting a plurality of steps of rotational amount, and a joy stick capable of detecting a plurality of steps of inclination angle.

Although, in the above-described exemplary embodiment, the zooming speed is used as a setting value (processing content) to be registered to each operation level (depression level), the present invention is not limited thereto. The above-described exemplary embodiment is also applicable to setting values of other setting items. The above-described processing is not limited to camera functions. For example, the above-described exemplary embodiment is also applicable to a case of registering the sound output level (sound volume) of notification sound, movie sound, or the like, to each operation level (depression level) of an operation member.

Figure 12:
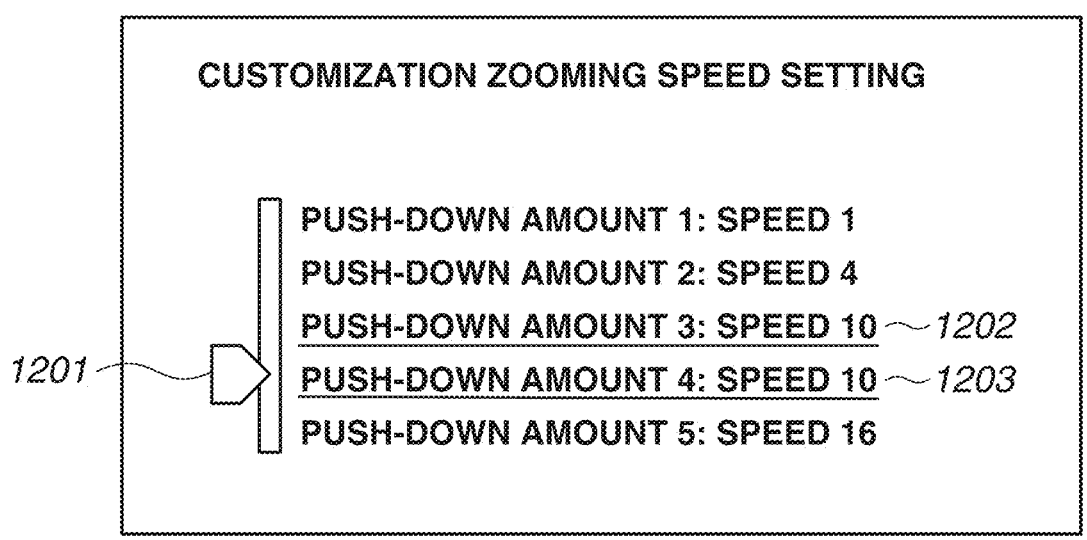
FIG. 12 illustrates another display example in response to depression of the zoom key.

A depression level display corresponding to the depression amount of the zoom key 104 described above with reference to FIGS. 6A to 6E is not limited to speed bar displays for the respective depression levels described above with reference to FIGS. 6A to 6E. For example, in a display as illustrated in FIG. 12, in which depression levels and assigned zooming speeds are displayed with character strings, depression levels corresponding to depression amounts of the zoom key 104 may be displayed. Referring to FIG. 12, an index 1201 corresponds to the index 420 described above with reference to FIGS. 6A to 6E, and the display position vertically moves according to the depression amount of the zoom key 104. Underlines 1202 and 1203 correspond to the highlight display described above with reference to FIGS. 6A to 6E. Like the example illustrated in FIG. 6C, the user can recognize which depression level corresponds to the current depression amount and recognize an other depression level assigned the same zooming speed. Referring to the example illustrated in FIG. 12, the push-down amount 4 (more specifically, the depression level 4) corresponds to the current depression amount, and the push-down amount 3 (depression level 3) is another depression level assigned the same zooming speed.

FIG. 6C illustrates an example where the depression level corresponding to the current depression amount on a specific operation member (zoom key 104) and another depression level assigned the same zooming speed are highlighted. However, the example is applicable, not limited to assignment setting values (zooming speeds) for the respective operation amounts (depression levels) on the same operation member. In a case where a plurality of operation members can be assigned different setting values and functions, the example is also applicable when presenting to the user the fact that a plurality of operation members is assigned the same setting value or function.

Figure 13:
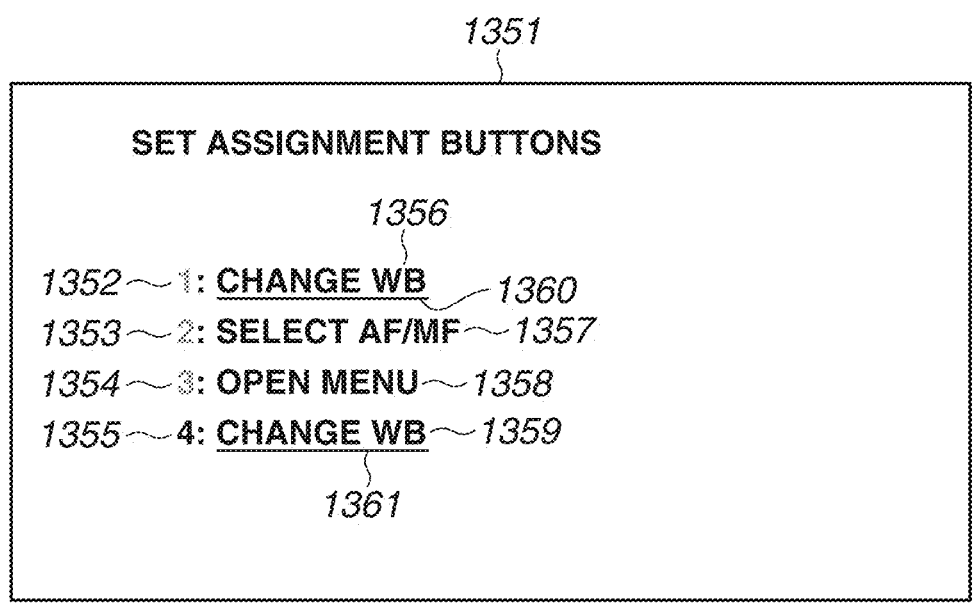
FIG. 13 illustrates a display example in response to depression of an assignment button.

FIG. 13 illustrates a display example of a setting confirmation screen 1351 on the display unit 28, which displays a setting situation where the assignment button 1 (1001) to the assignment button 4 (1004) are assigned desired functions by the user. Each of the assignment button 1 (1001) to the assignment button 4 (1004) can be assigned a function selected by the user out of a plurality of functions. When the user presses each assignment button, the assigned function is performed. FIG. 13 illustrates numbers 1 to 4 (1352 to 1355) of the assignment buttons 1 to 4, respectively. Function names 1356 to 1359 display functions assigned to the assignment buttons 1 to 4 corresponding to the numbers 1 to 4, respectively. Referring to the example illustrated in FIG. 13, the assignment button 1 (1001) is assigned a function of white balance (WB) selection, the assignment button 2 (1002) is assigned a function of AF/MF selection, the assignment button 3 (1003) is assigned a function of opening a menu, and the assignment button 4 (1004) is assigned a function of WB selection. When any one of the assignment buttons 1 (1001) to 4 (1004) is pressed, the number of the assignment button pressed out of the numbers 1 to 4 (1352 to 1355) is highlighted (for example, displayed with a bold black letter), and the numbers of the other assignment buttons are displayed in gray. This enables the user to recognize the pressed assignment button and the function assigned to the pressed assignment button. Referring to the example illustrated in FIG. 13, the assignment button 4 (1004) is pressed, the number 4 (1355) is highlighted, and the other numbers are displayed in gray. The function assigned to the pressed assignment button is underlined to emphasize the function name. In addition, an other assignment button assigned a function that is the same as the function assigned to the pressed assignment button is also underlined to emphasize the function name. Referring to the example illustrated in FIG. 13, the function name "CHANGE WB" corresponding to the pressed assignment button 4 is supplied with an underline 1361, and the function name "CHANGE WB" corresponding to the assignment button 1 different from the pressed assignment button 4 is also supplied with an underline 1360. This enables the user to recognize that the function "CHANGE WB" can also be executed by pressing the assignment button 1 instead of pressing the assignment button 4 currently being pressed. Therefore, if the user intentionally assigns the same function to two different assignment buttons, this display example enables the user to recognize that the functions are correctly set according to the user's intention. In addition, if the user assigns the same function to two different assignment buttons in mistake, this display example enables the user to recognize the situation and, if necessary, assign another function to either one of the two assignment buttons. Likewise, the above-described exemplary embodiment is also applicable to an operation member which can be assigned different functions at a plurality of operated positions or in a plurality of operating directions, like a cross key and a joy stick. More specifically, when such an operation member is operated, the system control unit 50 may make an identification display of the operated position, operating direction, or processing content assigned thereto and, at the same time, make an identification display of another operated position or operating direction assigned the same processing content. Generally, a processing content can be set for each of a plurality of operation methods. When the operation member is operated with any one of operation methods, the system control unit 50 performs an identification display of the used operation method or the processing content assigned to the operation method. In addition, the system control unit 50 performs an identification display of another operation method which can specify a processing content that is the same as that assigned to the used operation method, or the processing content assigned to the another operation method. In this case, the system control unit 50 displays the information so as to be identifiable from the operation method assigned a different processing content.

The above-described various control described to be performed by the system control unit 50 may be performed by one hardware component, or the entire apparatus may be controlled by a plurality of hardware components (for example, a plurality of processors and circuits) which share processing.

While the present invention has specifically been described based on an exemplary embodiment, the present invention is not limited thereto but can be modified in diverse ways without departing from the spirit and scope thereof. The above-described exemplary embodiment is to be considered as illustrative and not restrictive of the scope of the present invention. Exemplary embodiments can be suitably combined.

Although, in the above-described exemplary embodiment, the present invention is applied to the digital camera 100, the present invention is not limited thereto. The present invention is applicable to electronic apparatuses capable of assigning setting values and functions to an operation member in response to a user operation, and electronic apparatuses which can be controlled based on different parameters for each operation amount of the operation member. More specifically, the present invention is applicable to PCs, personal digital assistants (PDAs), mobile phone terminals, portable image viewers, printer apparatuses having a display, digital photo frames, music players, game machines, electronic book readers, home electrical appliances, onboard devices, and so on.

OTHER EXEMPLARY EMBODIMENTS

The present invention is also implemented by performing the following processing. Specifically, software (program) for implementing the functions of the above-described exemplary embodiment is supplied to a system or apparatus via a network or various types of storage media, and a computer (or CPU or micro processing unit (MPU)) of the system or apparatus reads and executes the program. In this case, the program and the storage medium storing the program are included in the present invention.

According to the above-described exemplary embodiment, when a plurality of values in a large number of steps is displayed as a plurality of values in a small number of steps in a simplified way, the plurality of values is displayed in such a way that differences between values can be recognized.

According to the above-described exemplary embodiment, when certain processing implementable in response to the current operation can be implemented through another operation, a user is notified of the another operation.

According to the above-described exemplary embodiment, when the user can assign a plurality of different values for a specific function to a plurality of steps of operation amount on an operation member, the user can easily perform an assignment operation.

According to the above-described exemplary embodiment, the following configurations are disclosed.

Embodiment A1

An electronic apparatus comprising,
an acquisition unit configured to acquire a plurality of values related to a specific function, the plurality of values being acquired in N steps; and
a display control unit configured to perform control to display a plurality of display items corresponding to the plurality of values acquired by the acquisition unit, the plurality of display items representing corresponding values in n steps, where n is smaller than N,
wherein a step represented by each display item included in the plurality of display items is determined according to a plurality of values other than a value corresponding to the display item out of the plurality of values acquired by the acquisition unit.

Embodiment A2

The electronic apparatus according to embodiment A1, wherein the number of the plurality of values acquired by the acquisition unit and the number of display items displayed by the display control unit are M which is 3 or more.

Embodiment A3

The electronic apparatus according to embodiment A2, wherein the step represented by each display item included in the plurality of display items is determined based on the number of values having a difference from a one-side adjacent value in ascending or descending order out of the M values acquired by the acquisition unit.

Embodiment A4

The electronic apparatus according to embodiment A2 or A3, wherein the step represented by each display item included in the plurality of display items is determined based on the number of groups having the same value out of the M values acquired by the acquisition unit.

Embodiment A5

The electronic apparatus according to any one of embodiments A1 to A4, wherein the display control unit performs control, in a first screen, to display the plurality of values related to the specific function in the n steps, and in a second screen, to display the plurality of values related to the specific function in L steps, where L is larger than n.

Embodiment A6

The electronic apparatus according to embodiment A5, wherein the plurality of values is setting values respectively associated with a plurality of operation degrees on a specific operation member, and
wherein the second screen is a screen for accepting an operation for changing the setting values.

Embodiment A7

The electronic apparatus according to embodiment A5 or A6, wherein the first screen is a recording standby screen displaying a live view image captured by an imaging unit or a screen displaying recording of a movie captured by the imaging unit.

Embodiment A8

The electronic apparatus according to embodiment any one of embodiments A5 to A7, wherein, in a situation where each of the plurality of values is identical in the first and second screens, a display area of each of the plurality of display items in n steps in the first screen is smaller than a display area of each of the plurality of display items in L steps in the second screen.

Embodiment A9

The electronic apparatus according to any one of embodiments A1 to A4, wherein the plurality of values is setting values respectively associated with a plurality of operation degrees on a specific operation member.

Embodiment A10

The electronic apparatus according to any one of embodiments A1 to A9, wherein the plurality of values is zooming speeds respectively associated with a plurality of operation degrees on an operation member for accepting a zooming operation.

Embodiment A11

The electronic apparatus according to any one of embodiments A1 to A10, wherein the display control unit performs control to display corresponding steps in terms of at least either one of a numeral value, a character string, a display area, a height, a width, brightness, and color of the display item.

Embodiment A12

A method for controlling an electronic apparatus, comprising:
acquiring a plurality of values related to a specific function, the plurality of values being acquired in N steps; and
performing control to display a plurality of display items corresponding to the plurality of values acquired in the acquiring, the plurality of display items representing corresponding values in n steps, where n is smaller than N,
wherein a step represented by each display item included in the plurality of display items is determined according to a plurality of values other than a value corresponding to the display item out of the plurality of values acquired in the acquiring.

Embodiment A13

A program for causing a computer to function as each unit of the electronic apparatus according to any one of embodiments A1 to A11.

Embodiment A14

A computer-readable storage medium storing a program for causing a computer to function as each unit of the electronic apparatus according to any one of embodiments A1 to A11.

Embodiment B1

An electronic apparatus comprising:
a setting unit configured to divide an operation amount on a specific operation member into M steps, and assign and set a processing content to each step of the operation amount; and
a control unit configured to perform control to, when the specific operation member is operated, perform an identification display of an N-th step corresponding to the operated operation amount so as to be identifiable from steps assigned other processing contents, and, when an i-th step different from the N-th step is assigned the same processing content as the N-th step, also perform the identification display of the i-th step.

Embodiment B2

The electronic apparatus according to embodiment B1, wherein the processing content set by the setting unit is a control value of a specific function, and is set in ascending or descending order of the plurality of steps of the operation amount.

Embodiment B3

The electronic apparatus according to embodiment B1 or B2, wherein the operation member is a pushable operation member, and the operation amount is a push-down amount on the operation member.

Embodiment B4

The electronic apparatus according to any one of embodiments B1 to B3,
wherein the operation member has a first operation portion and a second operation portion and is a seesaw-shaped operation member of which either one of the first and second operation portions can be pushed down by a user, and
wherein the operation amount is a push-down amount when the first operation portion or the second operation portion is pushed down from a reference position by a user operation.

Embodiment B5

The electronic apparatus according to any one of embodiments B1 to B4, further comprising a zoom control unit configured to perform control to perform zooming, wherein, based on a user operation, the setting unit is capable of setting a zooming speed for each of operation amounts in M steps on the specific operation member, and wherein, in response to an operation performed on the specific operation member, the zoom control unit performs control to zoom at a zooming speed set for the operation amount of the performed operation by the setting unit.

Embodiment B6

The electronic apparatus according to any one of embodiments B1 to B5, wherein the M steps are three or more steps.

Embodiment B7

The electronic apparatus according to any one of embodiments B1 to B6, wherein the control unit performs control to display a plurality of display elements respectively corresponding to the M steps in ascending order of steps, and perform an identification display in which, when the specific operation member is operated, the display element corresponding to the step assigned the processing content assigned to the N-th step out of the plurality of display elements is displayed so as to be identifiable from other display elements.

Embodiment B8

The electronic apparatus according to embodiment B7, wherein the display element is a bar-like rectangle having a height or width according to the processing content assigned to the corresponding step.

Embodiment B9

An electronic apparatus comprising:

a setting unit configured to assign and set a processing content to each of a plurality of operation methods; and a control unit configured to perform control to, when a first operation method is performed, perform an identification display of the first operation method or a processing content assigned to the first operation method so as to be identifiable from operation methods assigned other processing contents, and, when a second operation method different from the first operation method is assigned the same processing content as the first operation method, also perform the identification display of the second operation method or a processing content assigned to the second operation method.

Embodiment B10

The electronic apparatus according to embodiment B7, wherein the setting unit is capable of setting any one of a plurality of functions as the processing content to each of a plurality of operation methods.

Embodiment B11

The electronic apparatus according to embodiment B9 or B10, wherein the plurality of operation methods is any one of an operation for each of a plurality of operation members, an operation for each of a plurality of operation positions of a specific operation member, and an operation for each of a plurality of operation directions on a specific operation member.

Embodiment B12

The electronic apparatus according to any one of embodiments B1 to B11, wherein the identification display is performed in terms of at least one of color, frame lines, and an underline.

Embodiment B13

The electronic apparatus according to any one of embodiments B1 to B12, further comprising an imaging unit.

Embodiment B14

A method for controlling an electronic apparatus, the method comprising:

dividing an operation amount on a specific operation member into M steps, and assigning and setting a processing content to each step of the operation amount; and performing control to, when the specific operation member is operated, perform an identification display of an N-th step corresponding to the operated operation amount so as to be identifiable from steps assigned other processing contents, and, when an i-th step different from the N-th step is assigned the same processing content as the N-th step, also perform the identification display of the i-th step.

Embodiment B15

A method for controlling an electronic apparatus, the method comprising:

assigning and setting a processing content to each of a plurality of operation methods; and performing control to, when a first operation method is performed, perform an identification display of the first operation method or a processing content assigned to the first operation method so as to be identifiable from operation methods assigned other processing contents, and, when a second operation method different from the first operation method is assigned the same processing content as the first operation method, also perform the identification display of the second operation method or a processing content assigned to the second operation method.

Embodiment B16

A program for causing a computer to function as each unit of the electronic apparatus according to any one of embodiments B1 to B13.

Embodiment B17

A computer-readable storage medium storing a program for causing a computer to function as each unit of the electronic apparatus according to any one of embodiments B1 to B13.

Embodiment C1

An electronic apparatus comprising:

a detector configured to detect at least an operation amount in a first direction on an operation member; and an assignment unit configured to, based on a user operation, respectively assign different values of a specific function to a plurality of steps of the operation amount in the first direction, wherein the assignment unit is also capable of respectively assigning values based on at least one prestored preset pattern to the plurality of steps, and wherein the at least one preset pattern includes a preset pattern for assigning a first value of the specific function to a maximum step including a maximum operation amount in the first direction detectable by the detector, and respectively assigning the same values smaller than the first value to the plurality of steps in the first direction detectable by the detector, except for the maximum step and one in an inoperative state.

Embodiment C2

The electronic apparatus according to embodiment C1, wherein the first value is a maximum value settable for the specific function.

Embodiment C3

The electronic apparatus according to embodiment C1 or C2, wherein the at least one preset pattern further includes a first preset pattern, and wherein the first preset pattern is a pattern in which the plurality of steps of the operation amount in the first direction is respectively assigned different values, where a step having a larger operation amount is assigned a larger value.

Embodiment C4

The electronic apparatus according to embodiment C3, wherein the first preset pattern is a pattern in which the maximum step is assigned a maximum value settable for the specific function.

Embodiment C5

The electronic apparatus according to embodiment C3 or C4, wherein the first preset pattern is a pattern in which a minimum step including a minimum operation amount in the first direction detectable by the detector out of operation amounts indicating an operation is assigned a minimum value larger than 0 settable for the specific function.

Embodiment C6

The electronic apparatus according to any one of embodiments C3 to C5, wherein the first preset pattern is a pattern in which operation amounts respectively corresponding to the plurality of steps of the operation amount in the first direction are approximately proportional to magnitudes of values to be assigned.

Embodiment C7

The electronic apparatus according to any one of embodiments C1 to C6, wherein the at least one preset pattern includes a second preset pattern, and wherein the second preset pattern is a preset pattern in which, the maximum step is assigned the first value, and all of the steps other than the maximum step out of the plurality of steps corresponding to operation amounts indicating an operation are assigned a second value smaller than the first value.

Embodiment C8

The electronic apparatus according to embodiment C7, wherein the second value is equal to or smaller than a half of a maximum value settable for the specific function.

Embodiment C9

The electronic apparatus according to embodiment C8, wherein the second value is larger than a minimum value settable for the specific function.

Embodiment C10

The electronic apparatus according to any one of embodiments C1 to C9, wherein the at least one preset pattern includes a third preset pattern, and wherein the third present pattern is a preset pattern in which, the maximum step is assigned the first value, a minimum step including a minimum operation amount in the first direction detectable by the detector out of operation amounts indicating an operation is assigned a third value smaller than the first value, and all of the steps other than the maximum and the minimum steps out of the plurality of steps corresponding to operation amounts indicating an operation are assigned a fourth value smaller than the first value and larger than the third value.

Embodiment C11

The electronic apparatus according to embodiment C10, wherein the third value is a minimum value larger than 0 settable for the specific function.

Embodiment C12

The electronic apparatus according to embodiment C10, wherein the third value is 0.

Embodiment C13

The electronic apparatus according to any one of embodiments C10 to C12, wherein the fourth value is equal to or smaller than a half of a maximum value settable for the specific function.

Embodiment C14

The electronic apparatus according to any one of embodiments C1 to C13, wherein, based on a user operation, the assignment unit is capable of adjusting values respectively assigned to the plurality of steps from a state where the at least one preset pattern is assigned.

Embodiment C15

The electronic apparatus according to any one of embodiments C1 to C14, wherein the specific function is zooming, and the assignment unit respectively assigns zooming speeds to the plurality of steps.

Embodiment C16

The electronic apparatus according to embodiment C15, further comprising a control unit configured to perform control to perform a zoom drive at a zooming speed assigned to a step corresponding to an operation amount detected by the detector, by the assignment unit, depending on operation of the operation member.

Embodiment C17

The electronic apparatus according to embodiment C15 or C16, wherein the zoom is an optical zoom.

Embodiment C18

The electronic apparatus according to any one of embodiments C1 to C14, wherein a value of the specific function is a sound volume.

Embodiment C19

The electronic apparatus according to any one of embodiments C1 to C18, wherein the electronic apparatus is an imaging apparatus having an image sensor.

Embodiment C20

The electronic apparatus according to any one of embodiments C1 to C19, wherein the operation amount is a push-down amount when an operation portion of the operation member is pressed down from a reference position through a user's operation.

Embodiment C21

The electronic apparatus according to embodiment C20, wherein the operation member is a seesaw-shaped operation member having a pushable first operation portion and a pushable second operation portion.

Embodiment C22

The electronic apparatus according to any one of embodiments C1 to C19, wherein the operation member is any one of a push button capable of detecting a plurality of steps of depression amount, a pressure-sensitive operation device, a rotary operation member capable of detecting a plurality of steps of rotational amount, and an operation device capable of detecting a plurality of steps of inclination angle.

Embodiment C23

A method for controlling an electronic apparatus, the method comprising:
detecting at least an operation amount in a first direction on an operation member; and
respectively assigning different values of a specific function to a plurality of steps of the operation amount in the first direction based on a user operation,
wherein, in the assigning, values based on at least one prestored preset pattern can be respectively assigned to the plurality of steps, and
wherein the at least one preset pattern includes a preset pattern for assigning a first value of the specific function to a maximum step including a maximum operation amount in the first direction detectable in the detecting, and respectively assigning the same values smaller than the first value to the plurality of steps in the first direction detectable in the detecting, except for the maximum step and one in an inoperative state.

Embodiment C24

A program for causing a computer to function as each unit of the electronic apparatus according to any one of embodiments C1 to C22.

Embodiment C25

A computer-readable storage medium storing a program for causing a computer to function as each unit of the electronic apparatus according to any one of embodiments C1 to C22.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-170082, filed Sep. 11, 2018, No. 2018-170083, filed Sep. 11, 2018, and No. 2018-170084, filed Sep. 11, 2018, which are hereby incorporated by reference herein in their entirety.

What is claimed is:
1. An electronic apparatus comprising:
an operation key that is capable of being pressed to a plurality of depression levels, the plurality of depression levels corresponding to respective depression amounts of the operation key; and
a memory and at least one processor which function as:
a setting unit configured to set one setting value of a plurality of setting values for each of the plurality of depression levels of the operation key in response to a user operation; and a display control unit configured to perform control to display, as a plurality of bars, the plurality of setting values respectively set for the plurality of depression levels of the operation key in response to the user operation, each bar of the plurality of bars having a rectangle shape and a respective setting value being indicated by a length of the bar, the length being a height or a width of the rectangle shape, wherein the plurality of bars corresponding to the plurality of depression levels are arranged in order according to the respective depression amounts corresponding to the plurality of depression levels, wherein in first display processing, the display control unit is configured to perform control to display the plurality of bars including a first bar corresponding to a first depression level, a second bar corresponding to a second depression level that is adjacent to the first depression level in the order according to the respective depression amounts, a third bar corresponding to a third depression level, and a fourth bar corresponding to a fourth depression level that is adjacent to the third depression level in the order according to the respective depression amounts, with at least a length of the second bar, a length of the third bar, and a length of the fourth bar being determined based on a difference between a first setting value set for the first depression level and a second setting value set for the second depression level, and a difference between a third setting value set for the third depression level and a fourth setting value set for the fourth depression level, wherein the first depression level, the second depression level, the third depression level, and the fourth depression level are included in the plurality of depression levels, and the first setting value, the second setting value, the third setting value, and the fourth setting value are included in the plurality of setting values set in response to the user operation, the length of the second bar the length of the third bar, and the length of the fourth bar being larger than a length of the first bar by at least a predetermined amount in a case where the first setting value is different from the second setting value, wherein in the first display processing, a respective length of each bar of the plurality of bars is representable in n steps, and the n is an integer smaller than a total number of the plurality of setting values, and wherein in second display processing, the display control unit is configured to perform control to display the plurality of bars with a respective length of each bar of the plurality of bars being determined based on the respective setting value corresponding to the bar, wherein in the second display processing, the respective length of each bar of the plurality of bars is representable in N steps, and N is the total number of the plurality of setting values.

2. The electronic apparatus according to claim 1, wherein the operation key includes a first operation portion and a second operation portion, each of the first operation portion and the second operation portion being capable to be pressed to the plurality of depression levels, and wherein the display control unit displays, as the bars, the plurality of setting values respectively set for the plurality of depression levels of each of the first operation portion and the second operation portion.

3. The electronic apparatus according to claim 1, wherein, in a case where the third setting value set for the third depression level is same as the fourth setting value set for the fourth depression level that is adjacent to the third depression level in the order according to the respective depression amounts, the display control unit is configured to determine the length of the third bar to be same as the length of the fourth bar.

4. The electronic apparatus according to claim 1, wherein in the second display processing, a screen for accepting an operation for changing the plurality of setting values is displayed.

5. The electronic apparatus according to claim 1, wherein in the first display processing, a recording standby screen displaying a live view image captured by an imaging unit or a screen displaying recording of a movie captured by the imaging unit is displayed.

6. The electronic apparatus according to claim 1, wherein the plurality of setting values are setting values indicating zooming speed.

7. A non-transitory computer-readable storage medium storing a program for causing a computer to function as each unit of the electronic apparatus according to claim 1.

8. The electronic apparatus according to claim 1, wherein the plurality of setting values are setting values for executing a specific function, and the specific function is a zooming function in which a zoom lens is driven to change a focal length to change a zooming magnification.

9. A method for controlling an electronic apparatus having an operation key that is capable of being pressed to a plurality of depression levels, the plurality of depression levels corresponding to respective depression amounts of the operation key, the method comprising:

setting one setting value of a plurality of setting values for each of the plurality of depression levels of the operation key in response to a user operation;

performing control to display, as a plurality of bars, the plurality of setting values respectively set for the plurality of depression levels of the operation key in response to the user operation, each bar of the plurality of bars having a rectangle shape and a respective setting value being indicated by a length of the bar, the length being a height or a width of the rectangle shape, wherein the plurality of bars corresponding to the plurality of depression levels are arranged in order according to the respective depression amounts corresponding to the plurality of depression levels, wherein the performing control to display includes performing control to display, in first display processing, the plurality of bars including a first bar corresponding to a first depression level, a second bar corresponding to a second depression level that is adjacent to the first depression level in the order according to the respective depression amounts, a third bar corresponding to a third depression level, and a fourth bar corresponding to a fourth depression level that is adjacent to the third depression level in the order according to the respective depression amounts, with at least a length of the second bar, a length of the third bar, and a length of the fourth bar being determined based on a difference between a first setting value set for the first depression level and a second setting value set for the second depression level, and a difference between a third setting value set for the third depression level and a fourth setting value set for the fourth depression level, wherein the first depression level, the second depression level, the third depression level, and the fourth depression level are included in the plurality of depression levels, and the first setting value, the second setting value, the third setting value, and the fourth setting value are included in the plurality of setting values set in response to the user operation, the length of the second bar, the length of the third bar, and the length of the fourth bar being larger than a length of the first bar by at least a predetermined amount in a case where the first setting value is different from the second setting value, wherein in the first display processing, a respective length of each bar of the plurality of bars is representable in n steps, and the n is an integer smaller than a total number of the plurality of setting values; and performing control to display, in second display processing, the plurality of bars with a respective length of each bar of the plurality of bars being determined based on the respective setting value corresponding to the bar, wherein in the second display processing, the respective length of each bar of the plurality of bars is representable in N steps, and N is the total number of the plurality of setting values.

* * * * *